United States Patent
Zeng et al.

(10) Patent No.: US 12,212,015 B2
(45) Date of Patent: *Jan. 28, 2025

(54) BATTERY, AND RELATED DEVICE, PREPARATION METHOD AND PREPARATION APPARATUS THEREOF

(71) Applicant: CONTEMPORARY AMPEREX TECHNOLOGY (HONG KONG) LIMITED, Hong Kong (CN)

(72) Inventors: Yuqun Zeng, Fujian (CN); Xiaobo Chen, Fujian (CN); Peng Wang, Fujian (CN); Yao Li, Fujian (CN); Kai Wu, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/734,449

(22) PCT Filed: Jul. 10, 2020

(86) PCT No.: PCT/CN2020/101439
§ 371 (c)(1),
(2) Date: Dec. 2, 2020

(87) PCT Pub. No.: WO2022/006894
PCT Pub. Date: Jan. 13, 2022

(65) Prior Publication Data
US 2022/0021068 A1    Jan. 20, 2022

(51) Int. Cl.
*H01M 50/317* (2021.01)
*H01M 10/613* (2014.01)
(Continued)

(52) U.S. Cl.
CPC ....... *H01M 50/317* (2021.01); *H01M 10/613* (2015.04); *H01M 10/6554* (2015.04);
(Continued)

(58) Field of Classification Search
CPC .. H01M 50/507; H01M 50/602; H01M 50/30; H01M 50/308; H01M 50/317;
(Continued)

(56) References Cited

U.S. PATENT DOCUMENTS 8,105,708 B2   1/2012   Rudorff et al.
8,147,998 B2   4/2012   Yeo
(Continued)

FOREIGN PATENT DOCUMENTS

CN   101160689 A   4/2008
CN   101385187 A   3/2009
(Continued)

OTHER PUBLICATIONS

Office Action dated Sep. 16, 2022 received in U.S. Appl. No. 17/123,092.
(Continued)

*Primary Examiner* — Amanda J Barrow
(74) *Attorney, Agent, or Firm* — Scully, Scott, Murphy & Presser, P.C.

(57) ABSTRACT

The present application discloses a battery and a related device, preparation method, and preparation apparatus thereof. The battery includes: a plurality of battery cells, at least one battery cell of the plurality of battery cells including a pressure relief mechanism, and the pressure relief mechanism being configured, when an internal pressure of the at least one battery cell reaches a threshold, to be actuated to release the internal pressure; and a bus component configured to electrically connect the plurality of battery cells, wherein the pressure relief mechanism and the bus
(Continued)

component are respectively arranged on different sides of the at least one battery cell, such that emissions from the at least one battery cell are discharged in a direction away from the bus component when the pressure relief mechanism is actuated.

17 Claims, 22 Drawing Sheets

(51) Int. Cl.
*H01M 10/6554* (2014.01)
*H01M 50/209* (2021.01)
*H01M 50/507* (2021.01)

(52) U.S. Cl.
CPC ....... *H01M 50/209* (2021.01); *H01M 50/507* (2021.01); *H01M 2220/20* (2013.01)

(58) Field of Classification Search
CPC ............. H01M 50/325; H01M 60/342; H01M 50/3425; H01M 50/375
See application file for complete search history.

(56) References Cited

U.S. PATENT DOCUMENTS

| | | | |
|---|---|---|---|
| 8,758,923 B2 | 6/2014 | Yoon et al. | |
| 9,595,705 B1 | 3/2017 | Buckhout | |
| 10,476,115 B2 | 11/2019 | Smith et al. | |
| 11,450,916 B2 * | 9/2022 | Chen | H01M 10/613 |
| 11,631,919 B2 * | 4/2023 | Wu | H01M 10/615 |
| | | | 429/82 |
| 11,791,518 B2 * | 10/2023 | Zeng | H01M 10/613 |
| | | | 429/56 |
| 2009/0075158 A1 | 3/2009 | Rudorff et al. | |
| 2009/0159354 A1 | 6/2009 | Jiang et al. | |
| 2009/0181288 A1 | 7/2009 | Sato | |
| 2009/0220850 A1 * | 9/2009 | Bitsche | H01M 10/52 |
| | | | 429/50 |
| 2009/0274952 A1 | 11/2009 | Wood et al. | |
| 2009/0305114 A1 | 12/2009 | Yeo | |
| 2009/0305116 A1 | 12/2009 | Yang et al. | |
| 2010/0136391 A1 | 6/2010 | Prilutsky et al. | |
| 2011/0135994 A1 | 6/2011 | Yang et al. | |
| 2011/0293974 A1 | 12/2011 | Yoon et al. | |
| 2012/0114993 A1 | 5/2012 | Park et al. | |
| 2012/0164490 A1 | 6/2012 | Itoi et al. | |
| 2013/0011719 A1 | 1/2013 | Yasui et al. | |
| 2013/0059175 A1 | 3/2013 | Engel et al. | |
| 2013/0095356 A1 * | 4/2013 | Shimizu | H01M 50/3425 |
| | | | 429/88 |
| 2013/0240220 A1 | 9/2013 | Loureiro et al. | |
| 2015/0162648 A1 | 6/2015 | Yang et al. | |
| 2015/0214525 A1 | 7/2015 | Lim | |
| 2016/0293926 A1 * | 10/2016 | Yamada | H01M 50/10 |
| 2017/0040653 A1 | 2/2017 | Morris et al. | |
| 2017/0170439 A1 | 6/2017 | Jarvis et al. | |
| 2017/0279169 A1 | 9/2017 | Obrist et al. | |
| 2017/0301965 A1 * | 10/2017 | Kato | H01M 10/651 |
| 2018/0047959 A1 * | 2/2018 | Kruger | H01M 10/625 |
| 2018/0212208 A1 * | 7/2018 | Kim | H01M 10/613 |
| 2018/0261814 A1 | 9/2018 | Zacher | |
| 2018/0351219 A1 | 12/2018 | Smith et al. | |
| 2019/0173074 A1 | 6/2019 | Ogawa et al. | |
| 2019/0181419 A1 * | 6/2019 | Suba | H01M 10/0525 |
| 2019/0207184 A1 | 7/2019 | Koutari et al. | |
| 2019/0229384 A1 * | 7/2019 | Tasiopoulos | H01M 10/6554 |
| 2019/0273243 A1 * | 9/2019 | Motokawa | H01M 50/50 |
| 2020/0083575 A1 * | 3/2020 | Yoo | H01M 50/213 |
| 2020/0136110 A1 | 4/2020 | Koutari | H01M 50/543 |
| 2020/0152941 A1 * | 5/2020 | Wynn | H01M 50/317 |
| 2020/0194819 A1 * | 6/2020 | Aikata | H01M 10/0413 |
| 2020/0212526 A1 | 7/2020 | Wu et al. | |
| 2020/0251703 A1 * | 8/2020 | Aldrich | H01M 50/383 |
| 2021/0104801 A1 | 4/2021 | Chu et al. | |
| 2021/0135319 A1 | 5/2021 | You et al. | |
| 2021/0296721 A1 | 9/2021 | Omura et al. | |
| 2022/0013755 A1 * | 1/2022 | Chen | H01M 10/6554 |
| 2022/0013757 A1 | 1/2022 | Wu et al. | |
| 2022/0013849 A1 * | 1/2022 | Zeng | H01M 50/249 |
| 2022/0013853 A1 * | 1/2022 | Zeng | H01M 10/625 |
| 2022/0013854 A1 * | 1/2022 | Liang | H01M 10/655 |
| 2022/0069411 A1 * | 3/2022 | Wakabayashi | H01M 50/227 |

FOREIGN PATENT DOCUMENTS

| | | | |
|---|---|---|---|
| CN | 101483227 A | 7/2009 | |
| CN | 101604759 A | 12/2009 | |
| CN | 102598358 A | 7/2012 | |
| CN | 103123996 A | 5/2013 | |
| CN | 103460469 A | 12/2013 | |
| CN | 203589111 U | 5/2014 | |
| CN | 104956513 A | 9/2015 | |
| CN | 205488300 U | 8/2016 | |
| CN | 106784489 A | 5/2017 | |
| CN | 106785182 A | 5/2017 | |
| CN | 206301865 U | 7/2017 | |
| CN | 206401400 U | 8/2017 | |
| CN | 209401662 * | 9/2017 | ............. H01M 2/02 |
| CN | 207097998 U | 3/2018 | |
| CN | 208256764 U | 12/2018 | |
| CN | 208298909 U | 12/2018 | |
| CN | 110061329 A | 7/2019 | |
| CN | 209071461 U | 7/2019 | |
| CN | 209104274 U | 7/2019 | |
| CN | 110165104 A | 8/2019 | |
| CN | 110199406 A | 9/2019 | |
| CN | 110277533 A | 9/2019 | |
| CN | 209401662 U | 9/2019 | |
| CN | 209626294 U | 11/2019 | |
| CN | 209804781 U | 12/2019 | |
| CN | 209822772 U | 12/2019 | |
| CN | 110707260 A | 1/2020 | |
| CN | 210129540 U | 3/2020 | |
| CN | 111106227 A | 5/2020 | |
| CN | 111106277 A | 5/2020 | |
| CN | 210467893 U | 5/2020 | |
| CN | 210576161 U | 5/2020 | |
| CN | 210576163 U | 5/2020 | |
| CN | 111384324 A | 7/2020 | |
| CN | 211376746 U | 8/2020 | |
| CN | 213026308 U | 4/2021 | |
| CN | 213026309 U | 4/2021 | |
| CN | 213584016 U | 6/2021 | |
| CN | 213601965 U | 7/2021 | |
| CN | 114175363 A | 3/2022 | |
| CN | 114175365 A | 3/2022 | |
| CN | 114175377 A | 3/2022 | |
| CN | 114175378 A | 3/2022 | |
| CN | 114175381 A | 3/2022 | |
| CN | 114258611 A | 3/2022 | |
| DE | 102014001352 A1 | 8/2015 | |
| DE | 10 2017 212 223 A1 | 1/2019 | |
| EP | 2804188 A1 | 11/2014 | |
| EP | 2359432 B1 | 8/2018 | |
| EP | 3675218 A1 | 7/2020 | |
| EP | 3796412 A1 | 3/2021 | |
| JP | 2007-027011 A | 2/2007 | |
| JP | 2009164085 A | 7/2009 | |
| JP | 2009534811 A | 9/2009 | |
| JP | 2013509688 A | 3/2013 | |
| JP | 2014132585 A | 7/2014 | |
| JP | 2014-160573 * | 9/2014 | ............. H01M 2/10 |
| JP | 2014160573 A | 9/2014 | |
| JP | 2015018706 A | 1/2015 | |
| JP | 2018067387 A | 4/2018 | |
| JP | 2019029245 A | 2/2019 | |
| JP | 2019091628 A | 6/2019 | |
| JP | 2019129149 A | 8/2019 | |
| KR | 20100081942 A | 7/2010 | |
| KR | 101269721 B1 | 5/2013 | |
| KR | 20160066909 A | 6/2016 | |
| KR | 101799540 B1 | 11/2017 | |

(56) References Cited

FOREIGN PATENT DOCUMENTS

| KR | 20180104567 A | | 9/2018 | | |
|---|---|---|---|---|---|
| KR | 20190089121 A | | 7/2019 | | |
| RU | 60792 U1 | | 1/2007 | | |
| RU | 2636059 C2 | | 11/2017 | | |
| RU | 2675595 C1 | | 12/2018 | | |
| RU | 186666 U1 | | 1/2019 | | |
| RU | 2721432 C2 | | 5/2020 | | |
| WO | 2013006121 A1 | | 1/2013 | | |
| WO | 2013034225 A1 | | 3/2013 | | |
| WO | 2015045404 A1 | | 4/2015 | | |
| WO | WO 2018/234207 | * | 12/2018 | ............. | H01M 2/12 |
| WO | 2020/026973 A1 | | 2/2020 | | |
| WO | 2020133745 A1 | | 7/2020 | | |
| WO | 2020133751 A1 | | 7/2020 | | |
| WO | 2021008875 A1 | | 1/2021 | | |

OTHER PUBLICATIONS

Notice of Reasons for Refusal dated Jan. 16, 2023 received in Japanese Patent Application No. JP 2021-576383.
Notice of Reasons for Refusal dated Jan. 30, 2023 received in Japanese Patent Application No. JP 2021-578107.
Notice of Reasons for Refusal dated Jan. 30, 2023 received in Japanese Patent Application No. JP 2021-578156.
Examination Report dated Mar. 2, 2023 received in Indian Patent Application No. IN 202117059130.
Office Action dated Mar. 14, 2023 received in European Patent Application No. EP 20811946.1.
First Office Action dated Oct. 9, 2022 received in Chinese Patent Application No. CN 202080005847.2.
Office Action dated Oct. 21, 2022 received in U.S. Appl. No. 17/113,038.
Grant a Patent for an Invention dated Mar. 14, 2023 received in Russian Patent Application No. RU 2023100798/07 (001576).
Office Action dated Jun. 7, 2023 received in U.S. Appl. No. 17/113,042.
First Office Action dated Jul. 14, 2023 received in Chinese Patent Application No. CN 202080005870.1.
Notification of Registration and Grant of Patent for Invention dated Nov. 28, 2023 received in Chinese Patent Application No. CN 202080005854.2.
First Office Action dated Sep. 4, 2023 received in Chinese Patent Application No. CN 202080005840.0.
First Office Action dated Aug. 31, 2023 received in Chinese Patent Application No. CN 202080005854.2.
Office Action dated Aug. 3, 2023 received in Russian Patent Application No. RU 2023100981/07(002034).
Office Action dated Jul. 21, 2023 received in Russian Patent Application No. RU 2023101348/07(002853).
Office Action dated Jul. 11, 2023 received in Russian Patent Application No. RU 2023101521/07(003151).
Office Action dated Jul. 11, 2023 received in Russian Patent Application No. RU 2023101397/07(002925).
Office Action dated Jul. 11, 2023 received in Russian Patent Application No. RU 2023101396/07(002924).
Notice of Reasons for Refusal dated Aug. 21, 2023 received in Japanese Patent Application No. JP 2022-534435.
Notice of Reasons for Refusal dated Jul. 18, 2023 received in Japanese Patent Application No. JP 2022-538852.
Extended European Search Report dated Aug. 1, 2023 received in European Patent Application No. 23171327.2.
Office Action dated Jul. 4, 2023 received in Canadian patent Application No. CA 3,156,564.
Office Action dated Jun. 4, 2024 received in U.S. Appl. No. 17/113,013.
Office Action dated May 10, 2024 received in U.S. Appl. No. 17/113,042.
Notice of Preliminary Rejection dated Jan. 31, 2024 received in Korean Patent Application No. KR 10-2021-7043325.
Notice of Allowance dated Feb. 8, 2024 received in Korean Patent Application No. KR 10-2021-7042848.
Notification of Registration and Grant of Patent for Invention dated Dec. 1, 2023 received in Chinese Patent Application No. CN 202080005840.0.
Extended European Search Report dated Feb. 14, 2024 received in European patent Application No. EP 23204083.2.
Request for the Submission of an Opinion dated Sep. 20, 2024 received in Korean Patent Application No. 10-2022-7018654.

* cited by examiner

BATTERY, AND RELATED DEVICE, PREPARATION METHOD AND PREPARATION APPARATUS THEREOF

CROSS-REFERENCE TO RELATED APPLICATIONS

This application is a national stage of International Application No. PCT/CN2020/101439, filed on Jul. 10, 2020, which is hereby incorporated by reference in its entirety.

TECHNICAL FIELD

The present application relates to the field of batteries, and in particular to a battery, and a related device, preparation method and preparation apparatus thereof.

BACKGROUND

A chemical battery, an electrochemistry-based battery, an electrochemical battery or an electrochemical cell is a kind of device that converts the chemical energy of positive and negative electrode active materials into electric energy through a redox reaction. Different from an ordinary redox reaction, oxidation and reduction reactions are carried out separately, with oxidation at a negative electrode and reduction at a positive electrode, while electron gains and losses are carried out through an external circuit, thus forming a current. This is the essential characteristic of all batteries. After a long period of research and development, the chemical battery usher in the situation of a wide variety of applications, with a device being large enough to fit into a building, and small enough to be measured in millimeters. With the development of modern electronic technology, high requirements are put forward for the chemical battery. Every breakthrough in the chemical battery technology has brought a revolutionary development of electronic devices. Many electrochemical scientists around the world are interested in developing chemical batteries to power electric vehicles.

A lithium-ion battery, as a kind of chemical battery, has the advantages of a small volume, a high energy density, a high power density, a great number of times of cycle use, and long storage time, etc., and has been widely used in some electronic devices, electric transportation means, electronic toys and electric equipment. For example, lithium-ion batteries are widely used in mobile phones, laptops, electromobiles, electric vehicles, electric airplanes, electric ships, electronic toy cars, electronic toy ships, electronic toy airplanes, electric tools, and the like.

With the continuous development of the lithium-ion battery technology, higher requirements have been put forward for the performance of the lithium-ion battery. It is desirable that many design factors can be considered for the lithium-ion battery at the same time, among which the safety performance of the lithium-ion battery is particularly important.

SUMMARY

The present application proposes a battery and a related device, preparation method, and preparation apparatus thereof, which could improve the safety performance of the battery.

According to a first aspect of the present application, a battery is provided, the battery including: a plurality of battery cells, at least one battery cell of the plurality of battery cells including a pressure relief mechanism, and the pressure relief mechanism being configured, when an internal pressure or temperature of the at least one battery cell reaches a threshold, to be actuated to release the internal pressure; and a bus component configured to electrically connect the plurality of battery cells, wherein the pressure relief mechanism and the bus component are respectively arranged on different sides of the at least one battery cell, such that emissions from the at least one battery cell are discharged in a direction away from the bus component when the pressure relief mechanism is actuated.

Through such an arrangement of the pressure relief mechanism and the bus component, the safety performance of the battery can be significantly improved. First, in a case where, for example, the battery is applied to an electric vehicle and a thermal runaway occurs therein, the emissions from the battery cell will not be discharged toward the occupants in the cab, thereby improving the safety of the electric vehicle using the battery. Secondly, since the pressure relief mechanism and the bus component are respectively arranged on different sides of the battery cell, the emissions from the battery cell will not cause a short circuit between bus components, thereby significantly reducing the risk caused by the short circuit between the bus components and improving the safety performance of the battery.

In some embodiments, the battery further includes: a thermal management component, the thermal management component being configured to accommodate a fluid to adjust temperatures of the plurality of battery cells, and the thermal management component being configured to be capable of being damaged when the pressure relief mechanism is actuated, such that the emissions from the battery cell are capable of passing through the thermal management component. With the provision of the thermal management component, the temperature of the battery cells can be controlled more flexibly and actively. In addition, even in the case where a thermal runaway occurs in the battery, the emissions from the battery cell can be effectively discharged, thereby reducing the risk caused when the emissions cannot be smoothly discharged.

In some embodiments, the thermal management component is configured to be capable of being damaged when the pressure relief mechanism is actuated, such that the fluid flows out. This arrangement allows the high-temperature and high-pressure emissions from the battery cell to be effectively cooled, thereby improving the safety performance of the battery.

In some embodiments, the thermal management component includes: a first thermally conductive plate, the first thermally conductive plate being attached to the plurality of battery cells; a second thermally conductive plate, the second thermally conductive plate being arranged on a side of the first thermally conductive plate that is away from the battery cells; and a flow channel, the flow channel being formed between the first thermally conductive plate and the second thermally conductive plate for allowing the fluid to flow in the flow channel. In this way, the thermal management component can be manufactured more conveniently, thereby reducing the manufacturing cost.

In some embodiments, the thermal management component further includes an avoidance structure, the avoidance structure being configured to provide a space for allowing the pressure relief mechanism to be actuated, and the thermal management component being attached to the plurality of battery cells to form an avoidance chamber between the avoidance structure and the pressure relief mechanism. The provision of the avoidance structure can ensure that the pressure relief mechanism can be effectively actuated. In addition, the avoidance chamber can provide a buffer space for discharging the emissions from the battery cell, thereby reducing the impact pressure of the emissions from the battery cell to the outside, and further improving the safety performance of the battery.

In some embodiments, the avoidance structure includes a bottom avoidance wall and a side avoidance wall surrounding the avoidance chamber, and the bottom avoidance wall is configured to be capable of being damaged when the pressure relief mechanism is actuated, such that the emissions from the battery cell pass through the thermal management component. This arrangement achieves, in a simple manner and at low cost, the purpose of allowing the emissions to pass through the thermal management component when the pressure relief mechanism is actuated.

In some embodiments, the thermal management component further includes an avoidance structure, the avoidance structure being configured to provide a space for allowing the pressure relief mechanism to be actuated, wherein the avoidance structure is a through hole penetrating the thermal management component, and the side avoidance wall of the avoidance structure is a hole wall of the through hole. The use of the through hole can enable the emissions from the battery cell to be discharged out of the battery through the through hole more quickly, thereby reducing the risk of secondary high pressure caused by blocked discharge and improving the safety performance of the battery.

In some embodiments, the side avoidance wall is configured to be damaged when the pressure relief mechanism is actuated, such that the fluid flows out. This arrangement enables the fluid to flow out at low cost and in a simple manner, so as to use the fluid of the battery itself to quickly lower the temperature of the emissions from the battery cell, further improving the safety performance of the battery.

In some embodiments, the side avoidance wall forms a predetermined included angle with respect to a direction of the pressure relief mechanism toward the thermal management component, and the predetermined included angle is greater than or equal to 15° and less than or equal to 85°. In this way, the avoidance structure can be manufactured more easily, and moreover, it can also facilitate the damage of the side avoidance wall by the emissions from the battery cell, to ensure that the fluid can flow out.

In some embodiments, the thermal management component includes a relief mechanism configured to be actuated when the pressure relief mechanism is actuated, to allow at least the emissions from the battery cell to be discharged through the thermal management component. This arrangement ensures, in a simple and effective manner, that the emissions can pass through the thermal management component in a timely manner.

In some embodiments, the battery further includes a collection chamber, the collection chamber being configured to collect the emissions from the battery cell and the thermal management component when the pressure relief mechanism is actuated, wherein the avoidance chamber and the collection chamber are isolated by the thermal management component. The collection chamber can provide further buffering for the discharge of the emissions, to further reduce the impact pressure of the emissions. In addition, the collection chamber can further reduce the risk of secondary damage to the outside by the emissions.

In some embodiments, the battery further includes a collection chamber, the collection chamber being configured to collect the emissions from the battery cell and the thermal management component when the pressure relief mechanism is actuated, wherein the avoidance structure is in communication with the collection chamber. This arrangement enables the emissions to smoothly enter the collection chamber, to further reduce the risk of the emissions to the outside and reduce the pollution to the external environment. In addition, the collection chamber can provide further buffering for the discharge of the emissions, to further reduce the impact pressure of the emissions.

In some embodiments, the battery further includes a protective member, wherein the protective member is arranged on a side of the thermal management component that is away from the battery cells, and the collection chamber is arranged between the thermal management component and the protective member. The protective member can provide additional protection for the battery, to prevent the battery from being damaged by foreign objects and prevent external dust or debris from entering the interior of the battery. In addition, the protective member and the thermal management component further form the collection chamber to provide further buffering for the discharge of the emissions when the pressure relief mechanism is actuated, to reduce the impact pressure of the emissions.

In some embodiments, the battery further includes a sealing member arranged between the thermal management component and the protective member to seal the collection chamber. The provision of the sealing member can effectively prevent accidental discharge of the emissions from the collection chamber, thereby improving the safety performance of the battery.

In some embodiments, the battery further includes: a cover body, the cover body being adjacent to the bus component and the distance between the two being less than 2 mm. This arrangement enables the structure of the battery to be more compact, increases the effective utilization of the internal space of the battery, and therefore increases the volumetric energy density of the battery.

In some embodiments, the cover body is in contact with the bus component. This arrangement can further reduce the space occupied by a high-voltage component and a low-voltage control component of the battery, and increase the volumetric energy density.

In some embodiments, the battery further includes a case shell, the case shell and the cover body jointly forming, in an enclosing manner, an electrical chamber for accommodating the plurality of battery cells. The case shell and the cover body can provide a space for accommodating the plurality of battery cells and provide protection for the battery cells.

In some embodiments, the battery further includes: a cover body, the cover body including an accommodating space configured to be capable of accommodating the bus component; and an insulating portion, the insulating portion being attached to the cover body and being configured to cover at least the bus component. By embedding the bus component into the cover body, the external structure of the battery becomes more compact, and the volumetric energy density is increased. In addition, this approach is more convenient for maintenance operations of the battery.

In some embodiments, the insulating portion is applied or assembled to the cover body. This approach is more conducive to manufacturing of the battery.

In some embodiments, the battery further includes: a case shell, the case shell and the cover body jointly forming, in an enclosing manner, an electrical chamber for accommodating the plurality of battery cells; and a battery management unit, the battery management unit being at least partially arranged outside the electrical chamber. The battery management unit being at least partially arranged outside the electrical chamber is more conducive to the maintenance of the battery, especially the battery management unit.

In some embodiments, the battery management unit is at least partially embedded into the cover body. The battery management unit being at least partially arranged outside the electrical chamber is more conducive to the maintenance of the battery, especially the battery management unit.

In some embodiments, the thermal management component is a bottom portion of the case shell, and the case shell further includes a side portion, the side portion being hermetically connected to the thermal management component. In this way, the case shell can be manufactured more easily, to reduce the manufacturing cost.

In some embodiments, the thermal management component is integrated or arranged inside the case shell. In this way, the case shell can provide additional protection for the thermal management component, thereby improving the structural stability of the battery.

In some embodiments, the collection chamber is formed between the thermal management component and the case shell or is integrated inside the case shell. This arrangement enables the collection chamber to be formed more easily, thereby making it easier to manufacture and maintain the battery.

In some embodiments, the battery cell further includes a housing having an opening and enclosed by a plurality of walls, and a cover plate for closing the opening, wherein the pressure relief mechanism is arranged on at least one of the plurality of walls. This arrangement achieves, in a simple and effective manner, the purpose of arranging the pressure relief mechanism and the bus component on different sides, and therefore improves the safety performance of the battery.

In some embodiments, an outer surface of the pressure relief mechanism is flush with or recessed into an outer surface of the at least one wall. This arrangement can prevent the pressure relief mechanism from being accidentally damaged, and can also provide a certain avoidance space for the pressure relief mechanism when a thermal runaway occurs in the battery.

In some embodiments, the pressure relief mechanism is arranged at a corner portion between two adjacent walls of the plurality of walls. This arrangement can make the arrangement of the pressure relief mechanism more diversified, thereby improving the flexibility of the arrangement and placement of the battery cell.

In some embodiments, a plurality of pressure relief mechanisms are provided, the plurality of pressure relief mechanisms being arranged on one of the plurality of walls, or the plurality of pressure relief mechanisms being arranged on at least two of the plurality of walls. The provision of the plurality of pressure relief mechanisms can achieve rapid pressure relief when a thermal runaway occurs in the battery, thereby further improving the safety performance of the battery.

In some embodiments, the battery cell includes at least two walls, the at least two walls including a first wall and a second wall that intersect with each other, the pressure relief mechanism is provided at the first wall, and the thermal management component is attached to the first wall; and the battery further includes a support component, the support component being attached to the second wall, and configured to support the battery cell. This way of arranging the pressure relief mechanism on the side can further reduce the size of the battery in the height direction, and therefore make the structure of the battery more compact, which is conducive to the increase of the volumetric energy density.

In some embodiments, the battery further includes a collection chamber, the collection chamber being configured to collect the emissions from the battery cell and the thermal management component when the pressure relief mechanism is actuated, and the support component includes an additional collection chamber, the additional collection chamber being in communication with the collection chamber. This arrangement enables the emissions to smoothly enter the collection chamber, to further reduce the risk of the emissions to the outside. In addition, the additional collection chamber can provide further buffering for the discharge of the emissions, to further reduce the impact pressure of the emissions.

In some embodiments, the support component includes an additional collection chamber, the additional collection chamber being in communication with the collection chamber. The additional collection chamber can provide further buffering for the discharge of the emissions, to further reduce the impact pressure of the emissions.

In some embodiments, the battery further includes a case, the case including a cover body and a case shell, and the case shell and the cover body jointly forming, in an enclosing manner, an electrical chamber for accommodating the plurality of battery cells, wherein the support component is the bottom portion of the case shell or is arranged inside the case shell. This makes the arrangement of the support component more diversified, so that the battery can be manufactured in a variety of ways, thereby improving the flexibility of product manufacturing.

In some embodiments, the support component is the bottom portion of the case shell or is arranged inside the case shell. This makes the arrangement of the support component more diversified, so that the battery can be manufactured in a variety of ways, thereby improving the flexibility of product manufacturing.

In some embodiments, the support component is integral with the thermal management component as a one-piece component, or the support component is fastened to the thermal management component. This makes the arrangement of the support component more diversified, so that the battery can be manufactured in a variety of ways, improving the flexibility of product manufacturing.

In some embodiments, the support component includes an additional flow channel, the additional flow channel being in communication with the flow channel for allowing the fluid to flow therein in the thermal management component. This arrangement can facilitate the flow of the fluid, thereby improving the temperature adjustment effects of the battery, and can advantageously guide the discharge of the emissions.

In some embodiments, the support component includes an additional collection chamber, the additional collection chamber being in communication with the collection chamber. The additional collection chamber can provide further buffering for the discharge of the emissions, to further reduce the impact pressure of the emissions.

In some embodiments, the battery further includes a beam extending between the cover body and the case shell, wherein the thermal management component is arranged between the beam and the battery cell. This arrangement can fully increase the space utilization, and therefore make the battery more compact.

In some embodiments, the beam is hollow, and a hollow space of the beam constitutes the collection chamber. This arrangement can further increase the space utilization.

In some embodiments, an outer surface of the pressure relief mechanism is flush with or recessed into an outer surface of the first wall. This approach can prevent the pressure relief mechanism from being accidentally damaged, and can also provide a certain avoidance space for the actuation of the pressure relief mechanism.

In some embodiments, the battery cell further includes a housing having an opening and enclosed by a plurality of walls, and a cover plate for closing the opening, wherein the first wall includes the cover plate or at least one of the plurality of walls of the housing. This arrangement allows the battery cells to be placed in the case shell in various desired postures, so that the battery products can be more diversified without affecting the safety of the battery.

In some embodiments, the battery further includes: an attachment component adapted to be attached to the battery cell by means of an adhesive; and an isolation component, the isolation component being configured to prevent the adhesive from being applied between the attachment component and the pressure relief mechanism. With the provision of the isolation component, the adhesive can be prevented from being applied between the attachment component and the pressure relief mechanism in an effective manner during the production process of the battery. Moreover, the application efficiency and accuracy of the adhesive can also be improved, thereby improving the production efficiency of the battery.

In some embodiments, the isolation component includes: a main body; and a protrusion, wherein the protrusion protrudes from a surface of the main body in a protruding direction toward the outside of the main body, the protrusion is configured to be aligned with the pressure relief mechanism in the protruding direction when the main body is attached to the attachment component, and the peripheral size of the protrusion is greater than or equal to that of the pressure relief mechanism. This arrangement can prevent, in a simple and effective manner during the production process of the battery, the adhesive from being applied on the surface of the pressure relief mechanism, thereby avoiding obstruction to the pressure relief mechanism when it is actuated.

In some embodiments, the height of the protrusion is greater than or equal to a predetermined application height of the adhesive, and is configured to be compressed to keep consistent with the application height of the adhesive when the plurality of battery cells are attached to the attachment component. This arrangement ensures that the protrusion can effectively prevent the adhesive from being applied between the attachment component and the pressure relief mechanism. Moreover, this makes the isolation component not affect the reliable adhesive bonding between the attachment component and the pressure relief mechanism and the actuation of the pressure relief mechanism.

In some embodiments, the attachment component includes the thermal management component. In this way, the isolation component can be applied between the pressure relief mechanism and the thermal management component, so that the presence of the adhesive between the two does not affect the actuation of the pressure relief mechanism.

In some embodiments, the pressure relief mechanism includes at least one of a pressure-sensitive pressure relief mechanism and a temperature-sensitive pressure relief mechanism. This makes the selection of the pressure relief mechanism more diversified, so that products can also be more diversified to meet the requirements of different use environments and different users.

In some embodiments, the pressure relief mechanism includes a connection unit, the connection unit including an aperture and a first boss, the first boss being connected to an inner wall of the aperture and extending toward an axis of the aperture; a pressure relief sheet configured, when the internal pressure of the battery cell reaches the threshold, to be actuated to release the internal pressure, the pressure relief sheet being provided on a side of the first boss; a first protective sheet configured to protect the pressure relief sheet and arranged on the other side of the first boss that is away from the pressure relief sheet; a compression ring configured to press the first protective sheet and arranged on a side of the first protective sheet that is away from the first boss; and a pressing structure connected to the connection unit and capable of being pressed toward the axis of the aperture to press the compression ring. In this way, the pressure relief sheet can be prevented from directly making contact with an electrolytic solution in the battery cell, thereby reducing the corrosion of the pressure relief sheet by the electrolytic solution, and also alleviating the impact of the electrolytic solution on the pressure relief sheet. In addition, during the installation process, by providing a boss on the inner wall of the aperture of the connection unit, and providing the protective sheet and the pressure relief sheet on two sides of the boss, respectively, the pressure relief mechanism may be installed at the same time on both sides to simplify the installation process; and for the side where the protective sheet is installed, the protective sheet may be pressed by the compression ring, and then the compression ring is pressed by the pressing structure; the overall structure is simple and the operation is easy.

In some embodiments, the pressure relief mechanism further includes: a second protective sheet configured to protect the pressure relief sheet, the second protective sheet being installed on the connection unit and being located on a side of the pressure relief sheet that is away from the first boss and covering the pressure relief sheet. The second protective sheet provided on a side of the pressure relief sheet that is away from the interior of the battery cell may protect the pressure relief sheet from being affected by the external components.

In some embodiments, the battery cell further includes a connecting mechanism located in an opening of the wall of a housing where the pressure relief mechanism is arranged and having an annular shape, the connecting mechanism being configured to connect the pressure relief mechanism to the wall, wherein the pressure relief mechanism is located on a side of the connecting mechanism that is close to the interior of the housing. Through this arrangement, when the internal pressure or temperature of the battery cell reaches the threshold, the pressure relief mechanism has an enough space to fracture and open, so that the internal pressure of the battery cell can be released. In addition, when a thermal runaway occurs in the battery cell, the pressure relief mechanism is fractured, and a liquid or solid combustible material, which may also contain a conductive material, will be sprayed out while the internal gas pressure of the battery cell is released. Therefore, when the pressure relief mechanism is provided on the housing and is not located on the same side as electrode terminals on the cover plate, the short circuit between the electrode terminals may be avoided. Moreover, considering that the electrode terminals are generally directed upward, that is, toward a passenger, when the battery is installed in a vehicle, if the pressure relief mechanism is installed on the side different from the electrode terminals, gas flow and other materials released after the pressure relief mechanism is fractured will not be discharged to the passenger, which will not cause burn or scald to the passenger, reducing the risk of the passenger.

In some embodiments, the pressure relief mechanism is configured as a pressure relief region of a housing of the battery cell, the pressure relief region including a first recess provided on an inner surface of the housing of the battery cell and a second recess provided on an outer surface of the housing, and the first recess being provided opposite to the second recess, wherein a bottom wall of the first recess and/or a bottom wall of the second recess are/is provided with a third recess, and the pressure relief region is configured, when the internal pressure of the battery cell reaches the threshold, to be fractured at the third recess to release the internal pressure. In this way, the pressure relief region has a thicknesses at the third recess less than that of other regions of the battery cell, such that when a thermal runaway occurs in the battery cell, the battery cell can be fractured at the relatively weak third recess to release the internal pressure. In addition, as compared to the method in which the battery cell is additionally installed with a pressure relief mechanism, the pressure relief region in the embodiments of the present application has a simpler machining process. For example, the first recess, the second recess and the third recess may be provided through stamping, wherein the first recess is arranged opposite to the second recess, and specifically, through opposite stamping to simultaneously machine two recesses, such that the machining process is convenient and efficient. Moreover, the dimension, the shape, etc. of the three recesses are flexibly set and can be adjusted according to the practical applications.

According to a second aspect of the present application, a device is provided. The device includes a battery described in the first aspect above, the battery being configured to provide electrical energy for the device.

According to a third aspect of the present application, a method for preparing a battery is further provided. The method includes: providing a plurality of battery cells, at least one battery cell of the plurality of battery cells including a pressure relief mechanism, and the pressure relief mechanism being configured, when an internal pressure or temperature of the at least one battery cell reaches a threshold, to be actuated to release the internal pressure; providing a bus component configured to electrically connect the plurality of battery cells; and arranging the pressure relief mechanism and the bus component respectively on different sides of the at least one battery cell, such that emissions from the at least one battery cell are discharged in a direction away from the bus component when the pressure relief mechanism is actuated.

In some embodiments, the method further includes providing a thermal management component, the thermal management component being configured to accommodate a fluid to adjust the temperature of the plurality of battery cells, and the thermal management component being configured to be damaged when the pressure relief mechanism is actuated, such that the emissions from the battery cell pass through the thermal management component.

In some embodiments, the method further includes: attaching the thermal management component to a first wall of at least two walls of the battery cell and providing the pressure relief mechanism at the first wall; and attaching a support component to a second wall, and configured to support the battery cell.

In some embodiments, the method further includes: providing an attachment component adapted to be attached to the battery cell by means of an adhesive; and providing an isolation component, which is constructed to prevent the adhesive from being applied between the attachment component and the pressure relief mechanism.

According to a fourth aspect of the present application, an apparatus for preparing a battery is provided. The apparatus includes a battery cell preparation module configured to prepare a plurality of battery cells, at least one battery cell of the plurality of battery cells including: a pressure relief mechanism, the pressure relief mechanism being configured, when an internal pressure or temperature of the at least one battery cell reaches a threshold, to be actuated to release the internal pressure; a bus component preparation module configured to prepare a bus component, the bus component being configured to electrically connect the plurality of battery cells; and an assembly module configured to respectively arrange the pressure relief mechanism and the bus component on different sides of the at least one battery cell, such that emissions from the at least one battery cell are discharged in a direction away from the bus component when the pressure relief mechanism is actuated.

BRIEF DESCRIPTION OF THE DRAWINGS

The accompanying drawings described herein are intended to provide a further understanding of the present application, which constitute a part of the present application. Illustrative embodiments of the present application and the description thereof are for explaining the present application and do not constitute an undue limitation of the present application. In the drawings.

DESCRIPTION OF EMBODIMENTS

Figure 1:
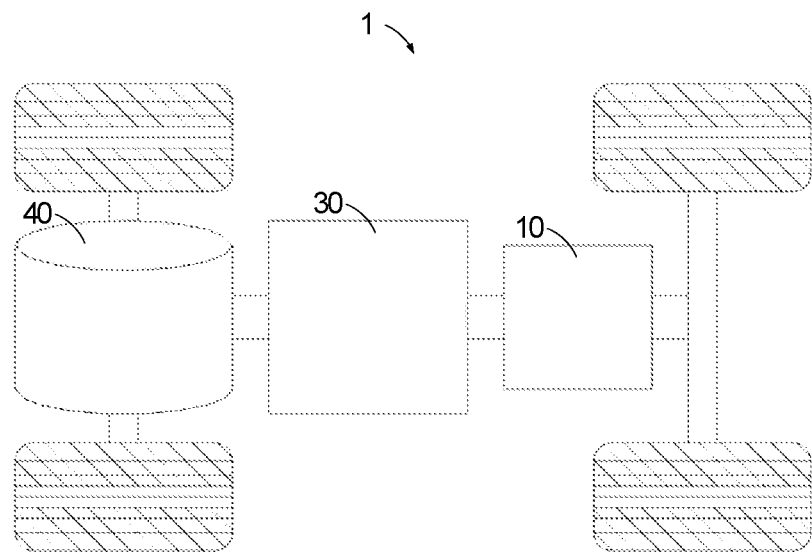
FIG. 1 shows a schematic structural diagram of some embodiments of a vehicle using a battery of the present application.

In order to make objects, technical solutions and advantages of the present application clearer, the technical solutions in the embodiments of the present application will be clearly and completely described below with reference to the drawings which show various embodiments of the present application. It should be understood that the described embodiments are merely some of, rather than all of, the embodiments of the present application. All the other embodiments obtained by a person of ordinary skill in the art based on the embodiments specified in the present application without involving any creative effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprise", "include", "have", "with", "involve", "contain" and the like in the specification and the claims of the present application as well as the description of the above drawings are open-ended terms. Therefore, a method or device, "comprising", "including", or "having", for example, one or more steps or elements, has one or more steps or elements, but is not limited to only having the one or more elements. The terms "first", "second" and the like in the specification and the claims of the present application as well as the above drawings are used to distinguish different objects, rather than to describe a specific order or primary-secondary relationship. In addition, the terms "first" and "second" are merely used for description and shall not be construed as indicating or implying relative importance or implicitly indicating the number of the indicated technical features. Thus, the features defined by the terms "first" and "second" can explicitly or implicitly include one or more features. In the description of the present application, the meaning of "a plurality of" is two or more, unless otherwise indicated.

In the description of the present application, it should be understood that the orientation or positional relationships indicated by the terms "center", "transverse", "length", "width", "upper", "lower", "front"; "rear", "left", "right", "vertical", "horizontal", "top", "bottom", "inside", "outside", "axial direction", "radial direction", "circumferential direction", etc. are based on the orientation or positional relationship shown in the accompanying drawings and are only for facilitating the description of the present application and simplifying the description, rather than indicating or implying that the device or element referred to must have a particular orientation or be constructed and operated in a particular orientation, and therefore will not be interpreted as limiting the present application.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

As mentioned above, it should be emphasized that when the term "comprise/include" is used in this specification, it is used to clearly indicate the presence of stated features, integers, steps or assemblies, but does not preclude the presence or addition of one or more other features, integers, steps, components or groups thereof. As used in the present application, the singular forms "a", "an" and "the" also include plural forms, unless otherwise clearly indicated in the context.

The terms "a" and "an" in this specification may mean one, but may also be consistent with the meaning of "at least one" or "one or more". The term "about" generally means the mentioned value plus or minus 10%, or more specifically plus or minus 5%. The term "or" used in the claims means "and/or" unless it is clearly stated that it only refers to an alternative solution.

In the present application, the term "and/or" is only an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

A battery mentioned in this field may be grouped into primary battery and rechargeable battery according to whether it is rechargeable. Primary battery is also called "disposable" battery and galvanic cell, because after its power is exhausted, it can no longer be recharged and can only be discarded. Rechargeable battery is also called secondary battery, secondary cell, or storage battery. The rechargeable battery has different manufacturing material and process from the primary battery, and has the advantage that it can be recycled multiple times after charging. The output current load capacity of the rechargeable battery is higher than that of most primary batteries. At present, the common types of rechargeable battery are: lead-acid battery, nickel-metal hydride battery and lithium-ion battery. The lithium-ion battery has the advantages of having a light weight, a large capacity (the capacity is 1.5 to 2 times that of the nickel-metal hydride battery of the same weight), no memory effect, etc., and has a very low self-discharge rate, so it is still widely used even if the price thereof is relatively high. At present, the lithium-ion battery is also widely used in battery electric vehicle and hybrid vehicle. The capacity of the lithium-ion battery for this purpose is relatively low, but it has relatively large output and charging current, and relatively long service life, although the cost is relatively high.

The battery described in the embodiments of the present application refers to a rechargeable battery. In the following, a lithium-ion battery will be taken as an example to describe the embodiments disclosed in the present application. It should be understood that the embodiments disclosed in the present application are applicable to any other suitable types of rechargeable batteries. The battery mentioned in the embodiments disclosed in the present application can be directly or indirectly applied to an appropriate device to power the device.

The battery mentioned in the embodiments disclosed in the present application refers to a single physical module including one or more battery cells to provide a predetermined voltage and capacity. The battery cell is basic unit in the battery, and may be generally grouped, according to the way of packaging, into: cylindrical battery cell, prismatic battery cell and pouch battery cell. The following will mainly focus on the prismatic battery cell. It should be understood that the embodiments described below are also applicable to the cylindrical battery cell or the pouch battery cell in certain aspects.

The battery cell includes a positive electrode sheet, a negative electrode sheet, an electrolytic solution and an isolation film. The operation of the lithium-ion battery cell mainly relies on the movement of lithium ions between the positive electrode sheet and the negative electrode sheet. For example, the lithium-ion battery cell uses an embedded lithium compound as an electrode material. Currently, the main common positive electrode materials used for the lithium-ion battery are: lithium cobalt oxide ($LiCoO_2$), lithium manganate ($LiMn_2O_4$), lithium nickelate ($LiNiO_2$) and lithium iron phosphate ($LiFePO_4$). The isolation film is provided between the positive electrode sheet and the negative electrode sheet to form a thin-film structure with three layers of material. The thin-film structure is generally made into an electrode assembly with a desired shape by means of winding or stacking. For example, the thin-film structure with three layers of material in the cylindrical battery cell is wound into a cylindrical electrode assembly, while in the prismatic battery cells, the thin-film structure is wound or stacked into an electrode assembly having a roughly cubic shape.

In the general battery cell structures, the battery cell includes a battery box, an electrode assembly and an electrolytic solution. The electrode assembly is accommodated in the battery box of the battery cell. The electrode assembly includes a positive electrode sheet, a negative electrode sheet and an isolation film. The material of the isolation film may be PP or PE, etc. The electrode assembly may have a coiled structure or a laminated structure. The battery box includes a housing and a cover plate. The housing includes an accommodating chamber formed by a plurality of walls, and an opening. The cover plate is arranged at the opening to close the accommodating chamber. In addition to the electrode assembly, the electrolytic solution is also accommodated in the accommodating chamber. The positive electrode sheet and the negative electrode sheet in the electrode assembly each include an electrode tab. Specifically, the positive electrode sheet includes a positive electrode current collector and a positive electrode active material layer. The positive electrode active material layer is coated on a surface of the positive electrode current collector, and the positive electrode current collector not coated with the positive electrode active material layer protrudes from the positive electrode current collector coated with the positive electrode active material layer and is used as a positive electrode tab. The material of the positive electrode current collector may be aluminum, and the positive electrode active material may be lithium cobalt oxides, lithium iron phosphate, ternary lithium or lithium manganate, etc. The negative electrode sheet includes a negative electrode current collector and a negative electrode active material layer. The negative electrode active material layer is coated on a surface of the negative electrode current collector, and the negative electrode current collector not coated with the negative electrode active material layer protrudes from the negative electrode current collector coated with the negative electrode active material layer and is used as a negative electrode tab. The material of the negative electrode current collector may be copper, and the negative electrode active material may be carbon or silicon, etc. In order to ensure that no fusing occurs when a large current passes, there are a plurality of positive electrode tabs which are stacked together, and there are a plurality of negative electrode tabs which are stacked together. The electrode tabs are electrically connected to the electrode terminals located outside the battery cell via connecting members. The electrode terminals generally include a positive electrode terminal and a negative electrode terminal. For the prismatic battery cells, the electrode terminals are generally provided on the cover plate part. A plurality of battery cells are connected together in series and/or parallel via the electrode terminals, so as to be applied to various application scenarios.

In some high-power application scenarios such as electric vehicles, the application of the battery includes three levels: battery cell, battery module and battery pack. The battery module is formed by electrically connecting a certain number of battery cells together and putting them into a frame to protect the battery cells from external impact, heat, vibration, etc. The battery pack is the final state of the battery system mounted into the electric vehicle. The battery pack generally includes a case for packaging one or more battery cells. The case can prevent liquid or other foreign objects from affecting the charging or discharging of the battery cell. The case is generally composed of a cover body and a case shell. Most of the current battery packs are made by assembling various control and protection systems such as a battery management system (BMS) and a thermal management component on one or more battery modules. With the development of technology in the battery field, the level of battery module can be omitted, that is, the battery pack can be formed directly from battery cells. This improvement allows the battery system to increase the gravimetric energy density and the volumetric energy density while significantly reducing the number of parts. The battery mentioned in the present application includes a battery module or a battery pack.

With respect to battery cell, the main safety hazards come from the charging and discharging processes, and a suitable environmental temperature design is also required. In order to effectively avoid unnecessary losses, at least triple protection measures are generally taken for the battery cell. Specifically, the protection measures include at least a switching element, a properly selected isolation film material and a pressure relief mechanism. The switching element refers to an element that can stop the charging or discharging of a battery when the temperature or resistance in a battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing lithium ions from passing through the isolation film and terminating the internal reaction of the battery.

The pressure relief mechanism refers to an element or component that can be actuated when an internal pressure or temperature of the battery cell reaches a predetermined threshold so as to release the internal pressure and/or internal substances. The pressure relief mechanism is also called an anti-explosion valve, an air valve, a pressure relief valve or a safety valve, etc. The "actuation" mentioned in the present application means that the pressure relief mechanism acts or is actuated to release the internal pressure from the battery cell. The generated action may include but is not limited to: at least a portion of the pressure relief mechanism being fractured, torn, broken or opened, etc. When the pressure relief mechanism is actuated, high-temperature and high-pressure substances inside the battery cell are discharged outwards from an actuated position as emissions. In this way, the pressure in the battery cell can be released at a controllable pressure, thereby avoiding more serious accidents. The emissions from the battery cell mentioned in the present application include but are not limited to: the electrolytic solution, the dissolved or split positive and negative electrode sheets, fragments of the isolation film, high-temperature and high-pressure gas generated by reaction, and/or flame, etc. The high-temperature and high-pressure emissions are discharged in a direction of the pressure relief mechanism provided in the battery cell, and their strength and destructive power are huge, and may even break through one or more structures such as the cover body provided in this direction.

The conventional pressure relief mechanism is generally provided on the cover plate of the battery cell, that is, arranged on the same side as the electrode terminals on the cover plate. This arrangement has been applied in the battery field for many years, and has the rationality of its existence. Specifically, for the box of the battery cell, the cover plate is machined separately, which has a flat-plate-like structure, and the pressure relief mechanism can be firmly installed or formed on the cover plate by means of a simple and appropriate process. In contrast, arranging the pressure relief mechanism separately on the housing of the battery cell may use more complicated processes and bring about higher costs.

In addition, for the conventional pressure relief mechanism, a certain amount of avoidance space is required during actuation. The avoidance space refers to the space inside or outside the pressure relief mechanism in the actuation direction (i.e., the torn direction) when the pressure relief mechanism is actuated (for example, at least a portion of the pressure relief mechanism is torn). In other words, the avoidance space is the space that allows the pressure relief mechanism to be actuated. Since the cover plate has a thicker thickness than the housing, it is easier to form an avoidance space when the pressure relief mechanism is provided on the cover plate, thereby facilitating the design and manufacture of the battery cells. Specifically, the housing of the battery cell is formed by stamping an aluminum sheet. Compared with the cover plate, the wall thickness of the stamped housing is very thin. On the one hand, the relatively thin wall thickness of the housing makes it difficult to provide the pressure relief mechanism that requires an avoidance space on the housing. On the other hand, the one-piece concave structure of the housing makes it difficult to mount the pressure relief mechanism on the housing, which will also increase the cost of the battery cell.

In addition, providing the pressure relief mechanism on the wall of the housing has a serious problem of the pressure relief mechanism being more easily corroded by the electrolytic solution in the housing. In this case, the pressure relief mechanism is corroded due to long-term contact with the electrolytic solution, and corrosion may cause the pressure relief mechanism to fail prematurely, which further brings about safety hazards and the maintenance cost of the battery cell. The above problems are all factors that technicians need to consider when designing a battery. In the years during which the rechargeable battery industry is rapidly developed, battery manufacturers have considered the cost and various other factors, and the battery cell, especially the pressure relief mechanism of the traction battery cell is basically arranged on the cover plate of the battery cell, namely, the pressure relief mechanism and the electrode terminals of the battery cell are arranged on the same side. This has also become a design concept that battery designers have long upheld when designing batteries.

In general, changing the design concept of arranging the pressure relief mechanism on the cover plate requires researchers and those skilled in the art to solve various technical problems and overcome technical prejudices, and cannot be accomplished in one move.

For example, in the case where the battery is applied to a vehicle, the fact that the pressure relief mechanism is arranged on the cover plate of the battery cell has a problem that the emissions from the battery cell burns through the structure above the battery cell, which endangers the safety of the personnel in the cab. To solve this problem, it would have readily occurred to many researchers to strengthen at least one of multiple structures between the battery cell and the cab to prevent this problem from occurring. That is, due to the technical prejudices caused by the existence of the above-mentioned various problems or various other problems, those skilled in the art would not readily conceive of arranging the pressure relief mechanism in another position of the battery cell to solve this problem. This is also because such a design change is too risky and too difficult. This risk and difficulty hinders the researchers from arranging the pressure relief mechanism in another position of the battery cell.

In order to solve or at least partially solve the above problems and other potential problems of the batteries in the prior art, the inventors of the present application went the other way and propose a new battery after conducting a lot of research and experiments. The device to which the battery described in the embodiments of the present application is applicable includes but is not limited to: a mobile phone, a portable apparatus, a laptop, an electromobile, an electric vehicle, a ship, a spacecraft, an electronic toy, an electric tool, etc. For example, the spacecraft includes an airplane, a rocket, a space shuttle, a spaceship and the like; the electronic toy includes a fixed or mobile electronic toy, such as a game console, an electric vehicle toy, an electric ship toy, an electric aircraft toy and the like; and the electric tool includes a metal-cutting power tool, a grinding power tool, an assembly power tool and a railway power tool, such as an electric drill, an electric grinder, an electric wrench, an electric screwdriver, an electric hammer, an electric impact drill, a concrete vibrator and an electric planer.

For example, as shown in FIG. 1, which is a schematic diagram of a vehicle 1 according to an embodiment of the present application, the vehicle 1 may be a fuel vehicle, a gas vehicle or a new-energy vehicle. The new-energy vehicle may be a battery electric vehicle, a hybrid vehicle or an extended-range vehicle, or the like. A battery 10 may be provided inside the vehicle 1. For example, the battery 10 may be provided at the bottom or the head or the tail of the vehicle 1. The battery 10 may be configured to supply power to the vehicle 1. For example, the battery 10 may be used as an operation power supply of the vehicle 1. Moreover, the vehicle 1 may also include a controller 30 and a motor 40. The controller 30 is used to control the battery 10 to supply power to the motor 40, for example, for a working power demand of the vehicle 1 during startup, navigation and running. In another embodiment of the present application, the battery 10 can be used not only as an operation power supply of the vehicle 1, but also as a driving power supply of the vehicle 1, replacing or partially replacing fuel or natural gas to provide driving power for the vehicle 1.

Figure 2:
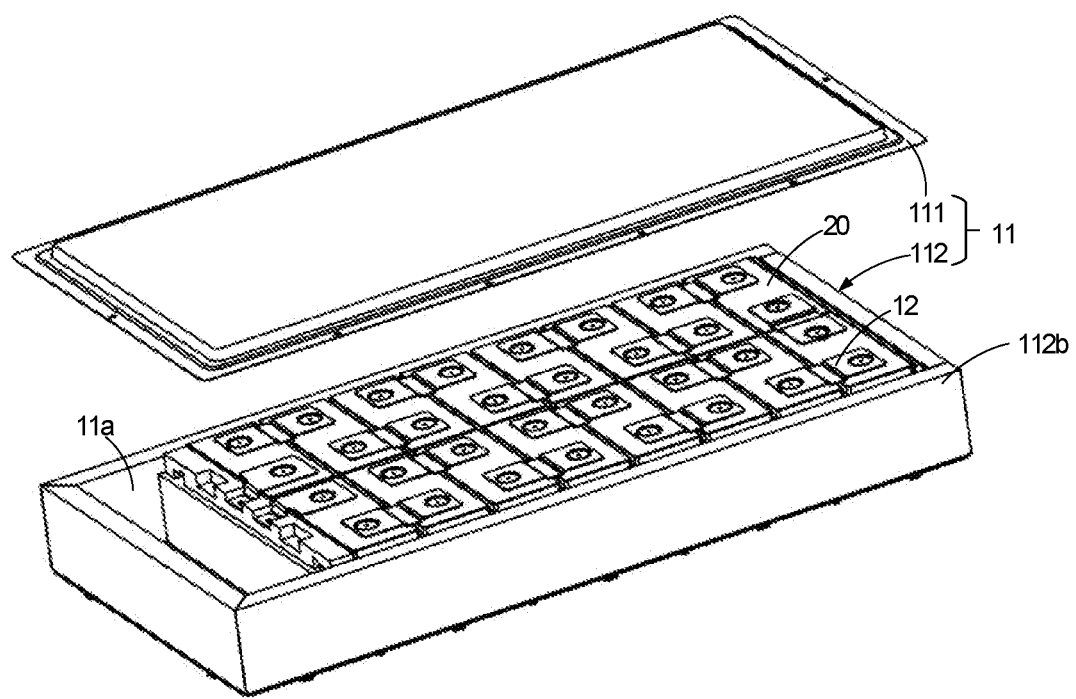
FIG. 2 shows a schematic exploded view of a battery according to some embodiments of the present application.
Figure 3:
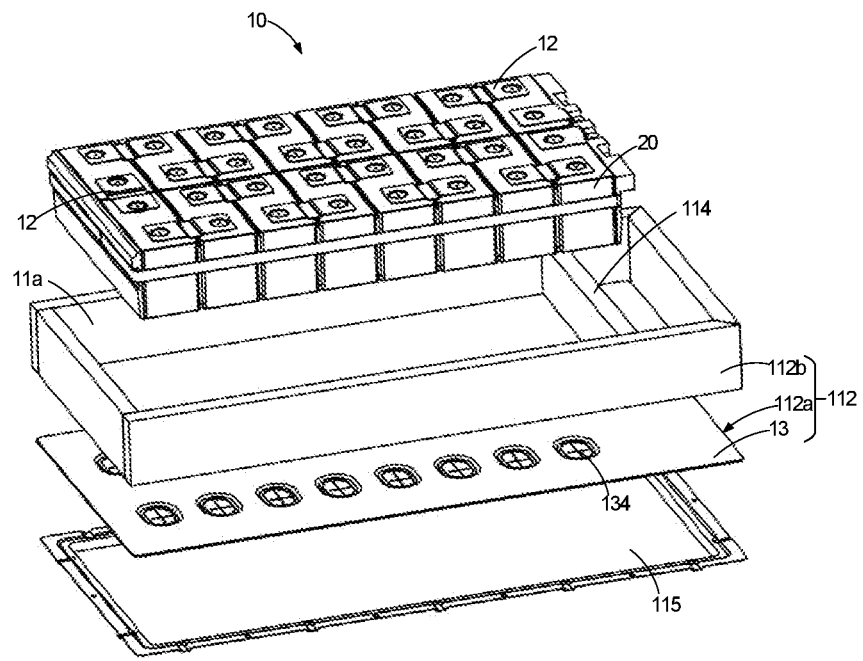
FIG. 3 shows a schematic exploded view of a battery according to some embodiments of the present application.

FIGS. 2 and 3 respectively show exploded views of a battery according to an embodiment of the present application. As shown in FIGS. 2 and 3, the battery 10 includes a plurality of battery cells 20 and a bus component 12 for electrically connecting the plurality of battery cells 20. In order to protect the battery cells 20 from being attacked or corroded by an external liquid or a foreign object, the battery 10 includes a case 11, which is used to package the plurality of battery cells 20 and other essential components, as shown in FIGS. 2 and 3. In some embodiments, the case 11 may include a cover body 111 and a case shell 112. The cover body 111 and the case shell 112 are hermetically assembled together to jointly form, in an enclosing manner, an electrical chamber 11a for accommodating the plurality of battery cells 20. In some optional embodiments, the cover body 111 and the case shell 112 may also be assembled with each other in an unsealed manner.

Figure 4:
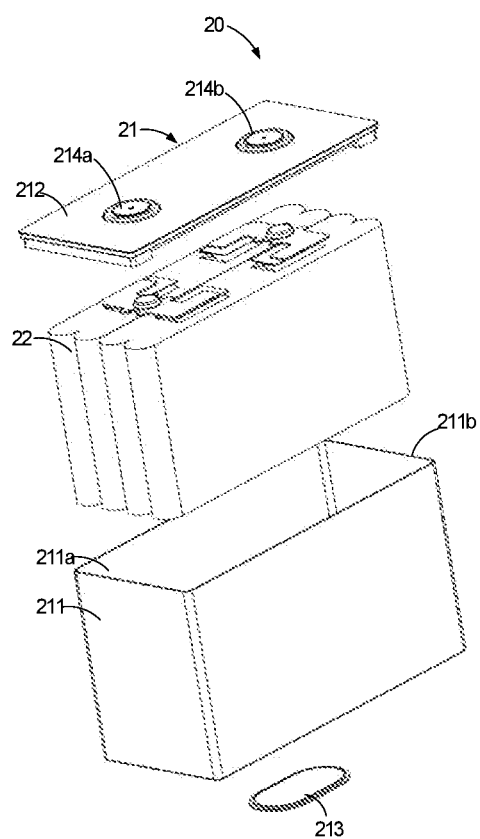
FIG. 4 shows a schematic exploded view of a battery cell according to some embodiments of the present application.
Figure 5:
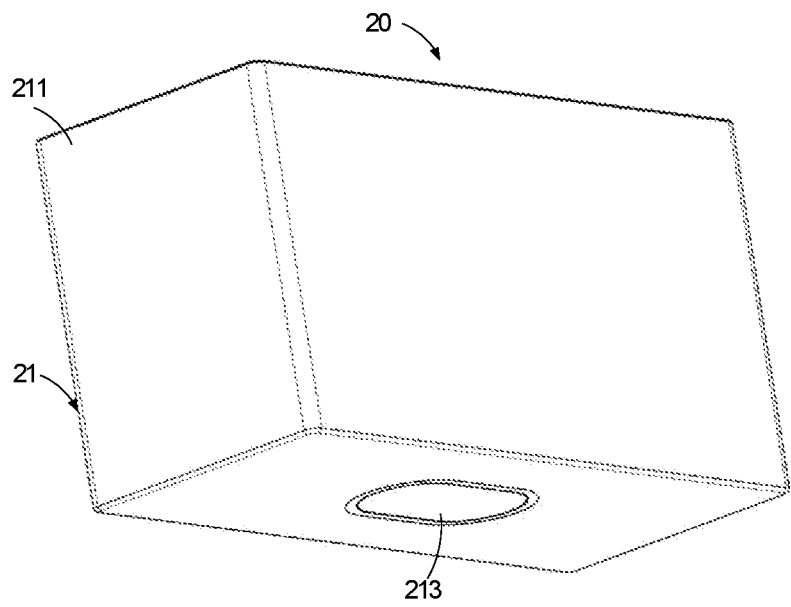
FIG. 5 shows a schematic perspective view of a battery cell according to some embodiments of the present application.
Figure 6:
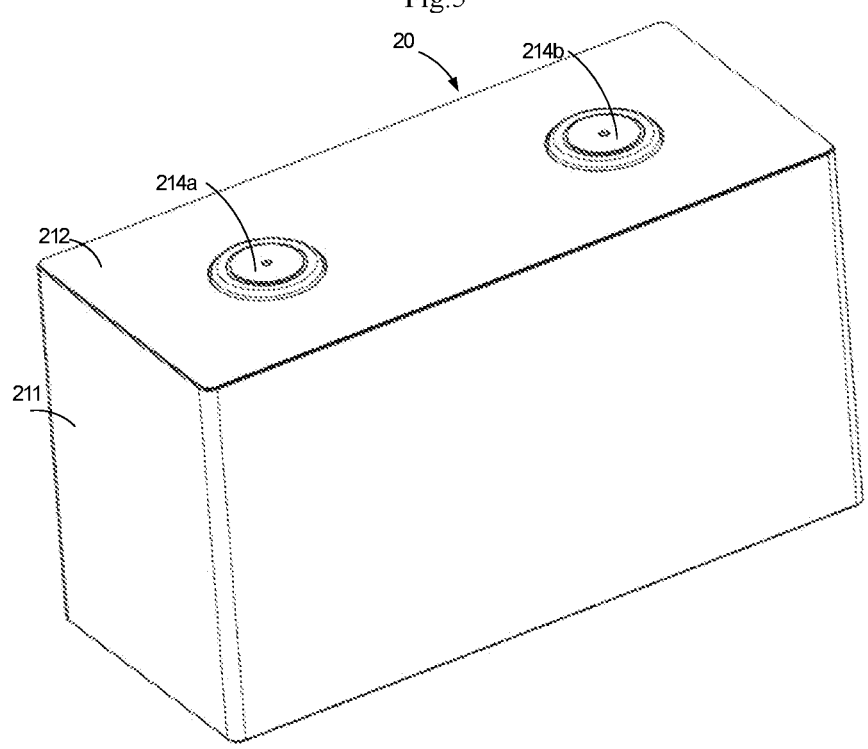
FIG. 6 shows a schematic perspective view of a battery cell according to some embodiments of the present application.

FIG. 4 shows an exploded view of a battery cell 20 according to an embodiment of the present application, and FIGS. 5 and 6 respectively show the perspective views of the battery cell 20 when viewed from different angles. As shown in FIGS. 4 to 6, in the battery cell 20 according to the present application, the battery cell 20 includes a box 21, an electrode assembly 22, and an electrolytic solution, wherein the electrode assembly 22 is accommodated in the battery box 21 of the battery cell 20. The battery box 21 includes a housing 211 and a cover plate 212. The housing 211 includes an accommodating chamber 211a formed by a plurality of walls, and an opening 211b. The cover plate 212 is arranged at the opening 211b to close the accommodating chamber 211a. In addition to the electrode assembly 22, the electrolytic solution is also accommodated in the accommodating chamber 211a. The positive electrode sheet and the negative electrode sheet in the electrode assembly 22 are each generally provided with an electrode tab. The electrode tabs generally include a positive electrode tab and a negative electrode tab. The electrode tabs are electrically connected to the electrode terminals 214 located outside the battery cell 20 via connecting members 23. The electrode terminals 214 generally include a positive electrode terminal 214a and a negative electrode terminal 214b. At least one battery cell 20 of the battery cells 20 in the battery 10 of the present application includes a pressure relief mechanism 213. In some embodiments, the pressure relief mechanism 213 may be provided on the battery cell 20, that may be more vulnerable to thermal runaway due to its position in the battery 10, among the plurality of battery cells 20. Of course, it is also possible that each battery cell 20 in the battery 10 is provided with a pressure relief mechanism 213.

The pressure relief mechanism 213 refers to an element or component that is actuated when an internal pressure or temperature of the battery cell 20 reaches a predetermined threshold so as to release the internal pressure. The threshold mentioned in the present application may be a pressure threshold or a temperature threshold. The threshold design varies according to different design requirements. For example, the threshold may be designed or determined according to the value of the internal pressure or the internal temperature of the battery cell 20 that is considered to be dangerous or at the risk of out-of-control. In addition, the threshold may depend on the material of one or more of the positive electrode sheet, the negative electrode sheet, the electrolytic solution and the isolation film in the battery cell 20. That is to say, the pressure relief mechanism 213 is configured, when an internal pressure or temperature of the at least one battery cell 20 where it is located reaches a threshold, to be actuated to release the internal pressure of the battery cell 20, thereby avoiding more dangerous accidents. As mentioned above, the pressure relief mechanism 213 may be also called an anti-explosion valve, a gas valve, a pressure relief valve or a safety valve, etc., and may specifically adopt a pressure-sensitive or temperature-sensitive element or structure. That is, when the internal pressure or temperature of the battery cell 20 reaches a predetermined threshold, the pressure relief mechanism 213 performs an action or a weakened structure provided in the pressure relief mechanism 213 is damaged, so as to form an opening or channel for releasing the internal pressure. The bus component 12 is also called a bus bar or a bus, etc., which is a component that electrically connects a plurality of battery cells 20 in series and/or in parallel. After the plurality of battery cells 20 are connected in series and parallel via the bus component 12, they have a higher voltage, so the side with the bus component 12 is sometimes called the high-voltage side.

Figure 7:
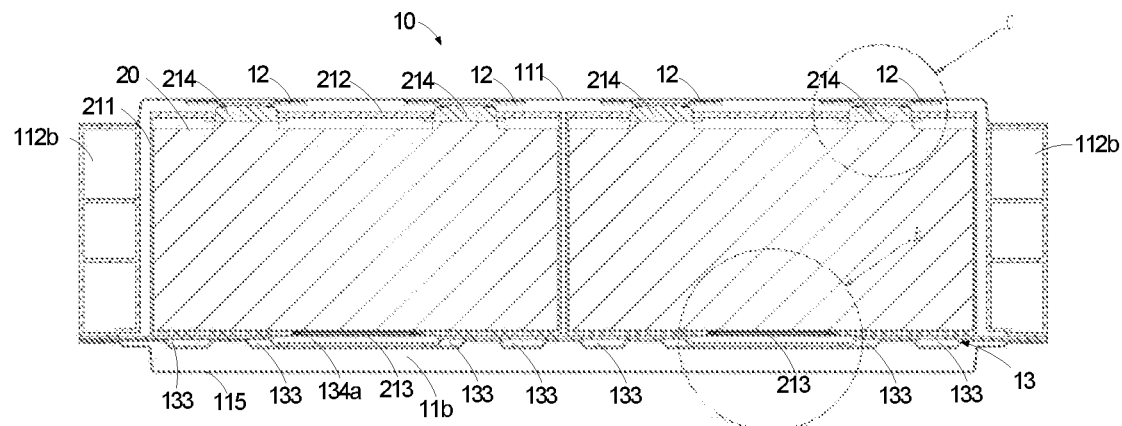
FIG. 7 shows a cross-sectional view of a battery according to some embodiments of the present application.

Different from the conventional battery, the pressure relief mechanism 213 and the bus component 12 in the battery 10 according to an embodiment of the present application are arranged on different sides of the battery cell 20, respectively. That is to say, the bus component 12 is generally arranged on the top side where the cover plate 212 is located, and the pressure relief mechanism 213 of the battery cell 20 according to the embodiment of the present application may be arranged on any appropriate side different from the top side. For example, FIG. 7 shows that the pressure relief mechanism 213 is arranged on the opposite side of the bus component 12. In fact, the pressure relief mechanism 213 may be arranged on any one or more walls of the housing 211 of the battery cell 20, which will be further explained below.

For example, when the battery 10 is applied to a scenario such as an electric vehicle, the high-voltage side with the bus component 12 is generally arranged on the side adjacent to the cab due to wiring and other relations, and the pressure relief mechanism 213 is arranged on a different side such that when the pressure relief mechanism 213 is actuated, the emissions from the battery cell 20 can be discharged in a direction away from the bus component 12. In this way, the hidden danger of the emissions discharged toward the cab that would endanger the safety of occupants is eliminated, thereby significantly improving the safety performance of the battery 10.

Moreover, since the emissions include various electrically conductive liquids or solids, arranging the bus component 12 and the pressure relief mechanism 213 on the same side has a great risk: the emissions may directly conduct the high-voltage positive electrode and the negative electrode resulting in a short circuit. A series of linked reactions caused by the short circuit may cause thermal runaway or explosion of all the battery cells 20 in the battery 10. By arranging the bus component 12 and the pressure relief mechanism 213 on different sides such that the emissions are discharged in the direction away from the bus component 12, the above problems can be avoided, thereby further improving the safety performance of the battery 10.

Figure 8:
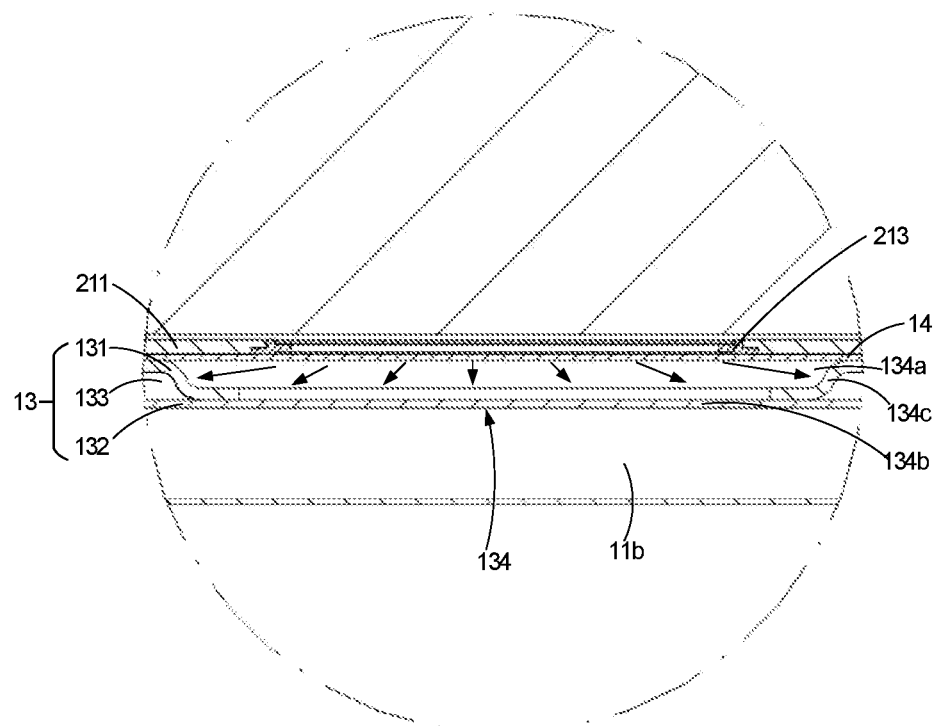
FIG. 8 shows an enlarged view of a part B of the battery shown in FIG. 7.

FIG. 8 shows an enlarged view of a part B in FIG. 7. As shown in FIG. 8, in some embodiments, the battery 10 may also include a thermal management component 13. The thermal management component 13 in the present application refers to a component that can manage and adjust the temperature of the battery cells 20. The thermal management component 13 can accommodate a fluid to manage and adjust the temperature of the battery cell 20. The fluid here may be liquid or gas. The management and adjustment of the temperature may include heating or cooling the plurality of battery cells 20. For example, in the case of cooling or lowering the temperature of the battery cells 20, the thermal management component 13 is configured to accommodate a cooling fluid to lower the temperature of the plurality of battery cells 20. In this case, the thermal management component 13 may also be called a cooling component, a cooling system or a cooling plate, etc. The fluid accommodated by the thermal management component 13 may also be called a cooling medium or a cooling fluid, and more specifically, may be called a cooling liquid or a cooling gas, wherein the cooling medium may be designed to flow in a circulating manner to achieve better temperature adjustment effects. The cooling medium may specifically use water, a mixture of water and ethylene glycol, or air, etc. In order to achieve the effective cooling, the thermal management component 13 is generally attached to the battery cells 20 by means of a thermally conductive silicone, etc. In addition, the thermal management component 13 may also be used for heating to raise the temperature of the plurality of battery cells 20. For example, in some areas with colder temperatures in winter, heating the battery 10 before starting the electric vehicle can improve the performance of the battery.

In some embodiments, the thermal management component 13 may include a pair of thermally conductive plates and a flow channel 133 formed between the pair of thermally conductive plates. For the convenience of the description below, the pair of thermally conductive plates will be referred to as a first thermally conductive plate 131 attached to the plurality of battery cells 20, and a second thermally conductive plate 132 arranged on the side of the first thermally conductive plate 131 that is away from the battery cells 20, as shown in FIG. 8. The flow channel 133 is used to accommodate the fluid and allow the fluid to flow therein. In some embodiments, the thermal management component 13 including the first thermally conductive plate 131, the second thermally conductive plate 132 and the flow channel 133 may be integrally formed by means of a suitable process such as blow molding, or the first thermally conductive plate 131 and the second thermally conductive plates 132 are assembled together by means of welding (such as brazing). In some alternative embodiments, the first thermally conductive plate 131, the second thermally conductive plate 132 and the flow channel 133 may also be formed separately and assembled together to form the thermal management component 13.

In some embodiments, the thermal management component 13 may constitute a part of the case 11 for accommodating the plurality of battery cells 20. For example, the thermal management component 13 may be a bottom portion 112a of the case shell 112 of the case 11. In addition to the bottom portion 112a, the case shell 112 includes a side portion 112b. As shown in FIG. 7, in some embodiments, the side portion 112b is formed as a frame structure, and can be assembled together with the thermal management component 13 to form the case shell 112. In this way, the structure of the battery 10 can be made more compact, and the effective utilization of space can be improved, thereby facilitating the improvement of the energy density.

The thermal management component 13 and the side portion 112b may be hermetically assembled together via a sealing member such as a sealing ring, a fastener, etc. In order to improve the sealing effect, the fastener may use a flow drill screw (FDS). Of course, it should be understood that this sealed assembly method is only illustrative and is not intended to limit the scope of protection of the content of the present application. Any other suitable assembly methods are also possible. For example, in some alternative embodiments, the thermal management component 13 may be assembled together by means of a suitable method such as adhesive bonding.

In some alternative embodiments, the thermal management component 13 and the side portion 112b may be integrally formed. That is to say, the case shell 112 of the case 11 may be integrally formed. This forming method can make the case shell 112 part stronger and less prone to leakage. In some alternative embodiments, the side portion 112b of the case shell 112 may also be integrally formed with the cover body 111. That is to say, in this case, the cover body 111 constitutes a structure with a lower opening, which can be closed by the thermal management component 13.

In other words, there may be various relations between the thermal management component 13 and the case 11. For example, in some alternative embodiments, the thermal management component 13 may not be a part of the case shell 112 of the case 11, but a component assembled on the side of the case shell 112 facing the cover body 111. This method is more conducive to keeping the case 11 airtight. In some alternative embodiments, the thermal management component 13 may also be integrated inside the case shell 112 by means of a suitable method.

In some embodiments, when the pressure relief mechanism 213 is actuated, it is necessary to provide an avoidance structure 134 outside the battery cell 20 at a position corresponding to the pressure relief mechanism 213, such that the pressure relief mechanism 213 can be smoothly actuated to perform its due role. In some embodiments, the avoidance structure 134 may be arranged on the thermal management component 13, such that when the thermal management component 13 is attached to the plurality of battery cells 20, an avoidance chamber 134a can be formed between the avoidance structure 134 and the pressure relief mechanism 213. That is to say, the avoidance chamber 134a mentioned in the present application refers to a closed cavity formed jointly by the avoidance structure 134 and the pressure relief mechanism 213. In this solution, for the discharge of the emissions from the battery cell 20, an inlet side surface of the avoidance chamber 134a can be opened by the actuation of the pressure relief mechanism 213, and an outlet side surface opposite to the inlet side surface can be partially damaged by the high-temperature and high-pressure emissions, thereby forming a relief channel for the emissions. According to some other embodiments, the avoidance chamber 134a may be, for example, a non-closed cavity formed jointly by the avoidance structure 134 and the pressure relief mechanism 213. The outlet side surface of the non-closed cavity may be originally provided with a channel for the emissions to flow out thereof.

As shown in FIG. 8, in some embodiments, the avoidance structure 134 formed on the thermal management component 13 may include a bottom avoidance wall 134b and a side avoidance wall 134c surrounding the avoidance chamber 134a. The bottom avoidance wall 134b and the side avoidance wall 134c in the present application are described relative to the avoidance chamber 134a. Specifically, the bottom avoidance wall 134b refers to the wall of the avoidance chamber 134a opposite to the pressure relief mechanism 213, and the side avoidance wall 134c is the wall adjacent to the bottom avoidance wall 134b and at a predetermined angle to surround the avoidance chamber 134a. In some embodiments, the bottom avoidance wall 134b may be a part of the second thermally conductive plate 132, and the side avoidance wall 134c may be a part of the first thermally conductive plate 131.

For example, in some embodiments, the avoidance structure 134 may be formed by recessing a part of the first thermally conductive plate 131 toward the second thermally conductive plate 132 and forming an opening, and fixing an edge of the opening and the second thermally conductive plate 132 together by means of an appropriate fixing method. When the pressure relief mechanism 213 is actuated, the emissions from the battery cell 20 will first enter the avoidance chamber 134a. As shown by the arrows in the avoidance chamber 134a in FIG. 8, the emissions will be discharged outward in directions approximately in the shape of a sector.

Different from the conventional thermal management component, the thermal management component 13 according to an embodiment of the present application can be damaged when the pressure relief mechanism 213 is actuated, such that the emissions from the battery cell 20 pass through the thermal management component 13. The advantage of this arrangement is that the high-temperature and high-pressure emissions from the battery cell 20 can pass through the thermal management component 13 smoothly, thereby avoiding secondary accidents caused by the emissions not being discharged in a timely manner, and thus improving the safety performance of the battery 10.

Figure 9:
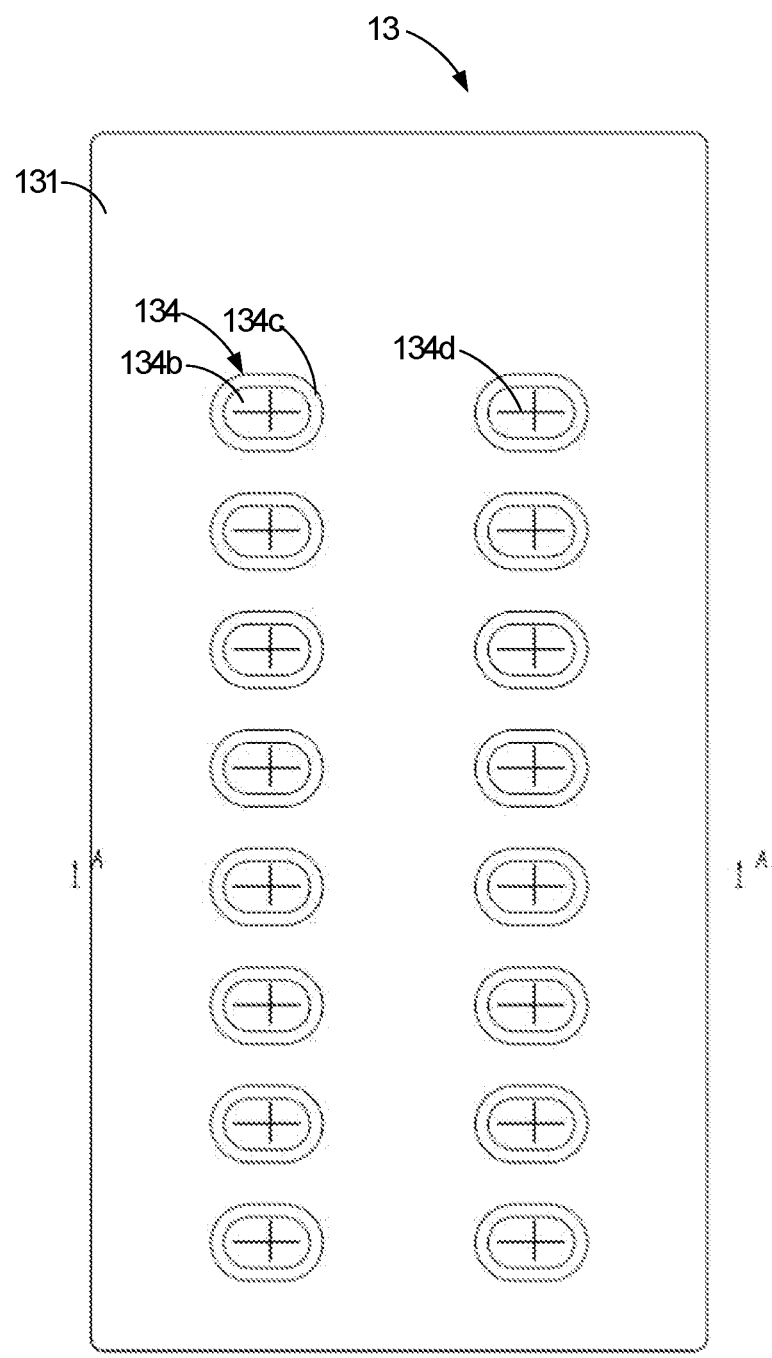
FIG. 9 shows a top view of a thermal management component according to some embodiments of the present application.
Figure 10:
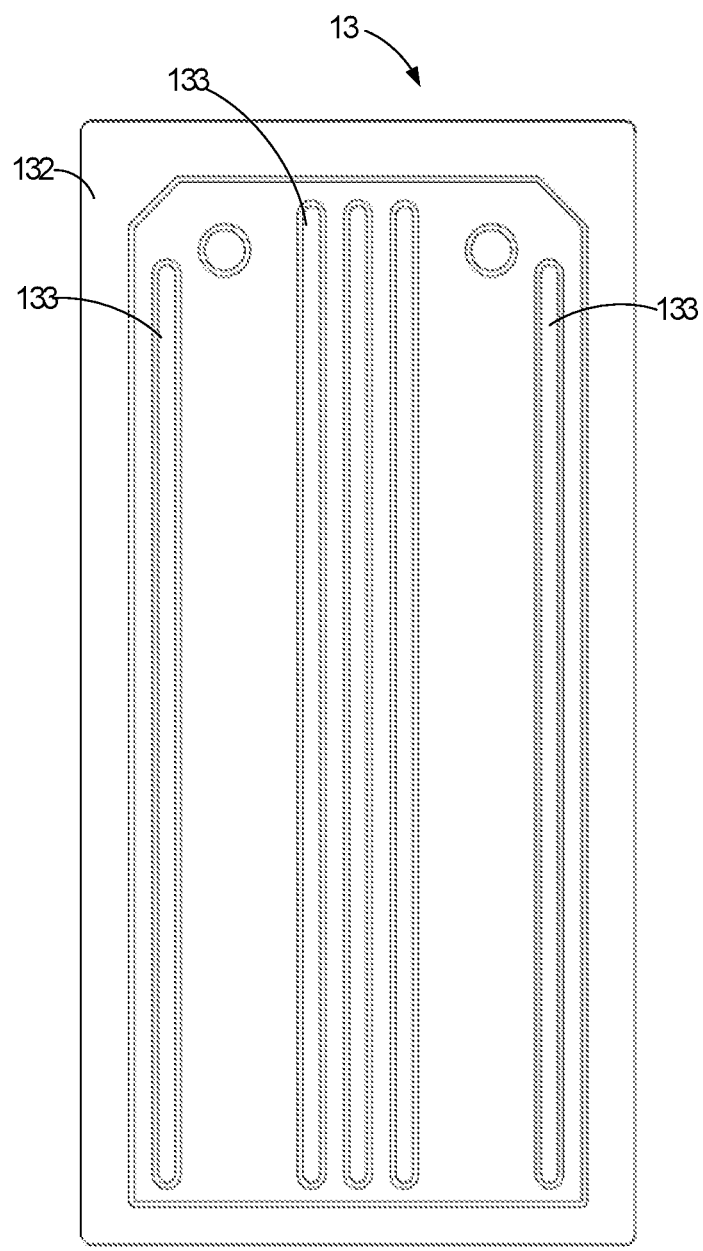
FIG. 10 shows a bottom view of the thermal management component shown in FIG. 9.
Figure 11:
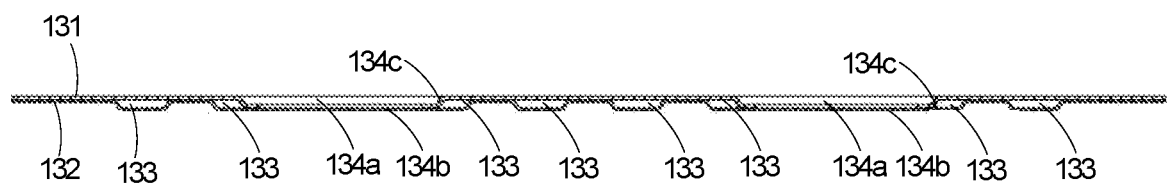
FIG. 11 shows a cross-sectional view, taken along line A-A, of the thermal management component shown in FIG. 9.
Figure 12:
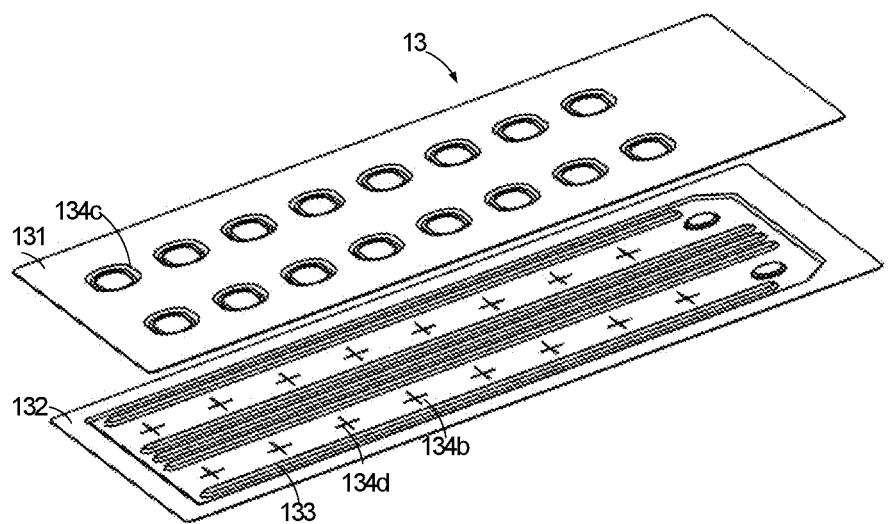
FIG. 12 shows an exploded view of the thermal management component shown in FIG. 9.
Figure 13:
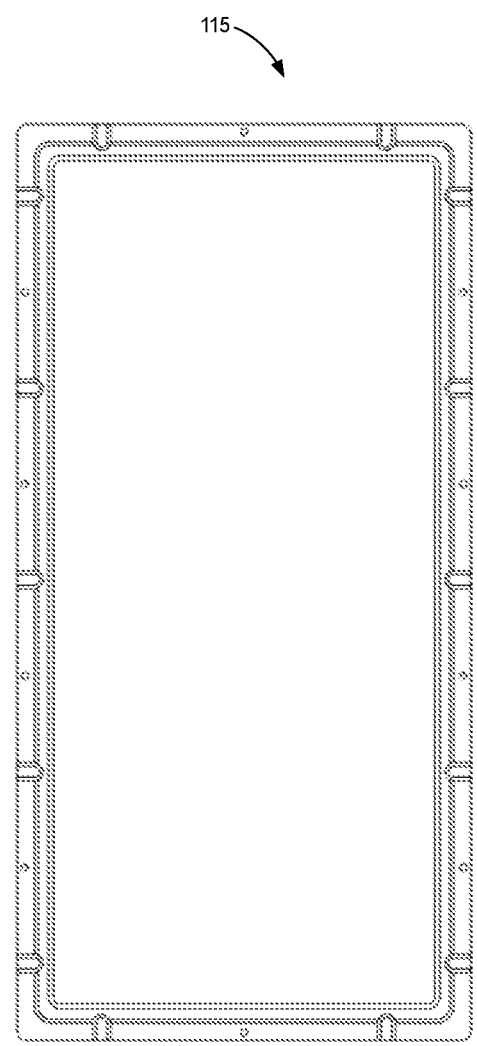
FIG. 13 shows a top view of a protective member according to some embodiments of the present application.

In order to enable the emissions to pass through the thermal management component 13 smoothly, the thermal management component 13 may be provided with a through hole or a relief mechanism at the position opposite to the pressure relief mechanism 213. For example, in some embodiments, a relief mechanism may be provided on the bottom avoidance wall 134b, that is, on the second thermally conductive plate 132. The relief mechanism in the present application refers to a mechanism that can be actuated when the pressure relief mechanism 213 is actuated so as to allow at least the emissions from the battery cell 20 to be discharged through the thermal management component 13. In some embodiments, the relief mechanism may also have the same configuration as the pressure relief mechanism 213 on the battery cell 20. That is to say, in some embodiments, the relief mechanism may be a mechanism arranged on the second thermally conductive plate 132 and having the same configuration as the pressure relief mechanism 213. In some alternative embodiments, the relief mechanism may also have a configuration different from that of the pressure relief mechanism 213, but only be a weakened structure provided at the bottom avoidance wall 134b. For example, the weakened structure may include, but is not limited to: a reduced-thickness portion integrated with the bottom avoidance wall 134b, an indentation (for example, a cross indentation 134d shown in FIG. 9), or a vulnerable portion made of a vulnerable material such as plastic and installed at the bottom avoidance portion 134b. Alternatively, the relief mechanism may be a temperature-sensitive or pressure-sensitive relief mechanism, which is actuated when the temperature or pressure sensed thereby exceeds a threshold.

In some embodiments, in order to enable the emissions to pass through the thermal management component 13 smoothly, the avoidance structure 134 may also be a through hole that penetrates the thermal management component 13. That is to say, the avoidance structure 134 may only have the side avoidance wall 134c, and the side avoidance wall 134c is the hole wall of the through hole. In this case, when the pressure relief mechanism 213 is actuated, the emissions from the battery cell 20 can be directly discharged through the avoidance structure 134. In this way, the formation of secondary high voltage can be avoided more effectively, thereby improving the safety performance of the battery 10.

In some embodiments, the thermal management component 13 may be further configured to be damaged when the pressure relief mechanism 213 is actuated, such that the fluid flows out. The outflow of the fluid can quickly lower the temperature of the high-temperature and high-pressure emissions from the battery cell 20 and extinguish fire, thereby preventing further damage to other battery cells 20 and the battery 10, which causes more serious accidents. For example, in some embodiments, the side avoidance wall 134c may also be formed to be easily damaged by emissions from the battery cell 20. Since the internal pressure of the battery cell 20 is relatively large, the emissions from the battery cell 20 will be discharged outward in a roughly cone shape. In this case, if the contact area between the side avoidance wall 134c and the emissions can be increased, the possibility of the side avoidance wall 134c being damaged can be increased.

For example, in some embodiments, the side avoidance wall 134c is configured to form a predetermined included angle with respect to a direction of the pressure relief mechanism 213 toward the thermal management component 13, and the included angle is greater than or equal to 15° and less than or equal to 85°. For example, the predetermined included angle shown in FIG. 8 is about 45°. By properly setting the included angle, the side avoidance wall 134c can be more easily damaged when the pressure relief mechanism 213 is actuated, so as to further enable the fluid to flow out and come into contact with the emissions, thereby achieving the effect of cooling the emissions in a timely manner. In addition, the predetermined included angle may also enable the side avoidance wall 134c to be formed more easily. For example, the predetermined included angle may provide a certain draft angle, thereby facilitating the manufacture of the side avoidance wall 134c and even the entire first thermally conductive plate 131.

In addition, this arrangement of the side avoidance wall 134c can be applied to the above situation where there is provided the avoidance chamber 134a and the situation where the avoidance structure 134 is a through hole. For example, in the case where the avoidance structure 134 is a through hole, the diameter of the through hole may gradually decrease in the direction of the pressure relief mechanism 213 toward the thermal management component 13, and an included angle formed by a wall of the through hole with respect to the direction of the pressure relief mechanism 213 toward the thermal management component 13 is greater than or equal to 15° and less than or equal to 85°.

Of course, it should be understood that the aforementioned shape of a predetermined included angle being formed by side avoidance wall 134c with respect to the direction of the pressure relief mechanism 213 toward the thermal management component 13 is only illustrative, and is not intended to limit the scope of protection of the content of the present application. Any other suitable structure that can facilitate the damage of the side avoidance wall 134c when the pressure relief mechanism 213 is actuated is feasible. For example, in some embodiments, any type of weakened structure may also be provided on the side avoidance wall 134c.

The above embodiments describe the case where the thermal management component 13 has the avoidance structure 134. That is to say, the avoidance chamber 134a mentioned in the above embodiments is formed by the avoidance structure 134 on the thermal management component 13 and the pressure relief mechanism 213. It should be understood that the above embodiments of the avoidance chamber 134a are only illustrative, and are not intended to limit the scope of protection of the content of the present application. Any other suitable structure or arrangement is also possible. For example, in some alternative embodiments, the thermal management component 13 may not include the avoidance structure 134. In this case, the avoidance chamber 134a may be formed, for example, by a protruding portion formed around the pressure relief mechanism 213 and the thermal management component 13. In addition, a relief mechanism or a weakened structure may be provided on the thermal management component 13 at a position opposite to the pressure relief mechanism 213 to enable the emissions from the battery cell 20 to pass through the thermal management component 13 and/or break through the thermal management component 13 such that the fluid flows out.

Of course, in some embodiments, the avoidance chamber 134a may not be employed. For example, for some pressure relief mechanisms 213 that can be actuated without the need for the avoidance space, the pressure relief mechanism 213 may be arranged closely to the thermal management component 13. Such a pressure relief mechanism 213 may include, but is not limited to, a temperature-sensitive pressure relief mechanism 213, for example. The temperature-sensitive pressure relief mechanism 213 is a mechanism that is actuated when the temperature of the battery cell 20 reaches a threshold to release the internal pressure of the battery cell 20. A corresponding alternative is a pressure-sensitive pressure relief mechanism 213. The pressure-sensitive pressure relief mechanism 213 is the pressure relief mechanism 213 mentioned above. The pressure-sensitive pressure relief mechanism 213 is a mechanism that is actuated when the internal pressure of the battery cell 20 reaches a threshold to release the internal pressure of the battery cell 20. The pressure relief mechanism 213 may have various forms, and specific improvements of the pressure relief mechanism 213 will be further illustrated below.

In some embodiments, the battery 10 further includes a collection chamber 11b, as shown in FIGS. 7 and 8. The collection chamber 11b in the present application refers to a cavity that collects the emissions from the battery cell 20 and the thermal management component 13 when the pressure relief mechanism 213 is actuated. The collection chamber 11b is configured to collect the emissions and may be sealed or unsealed. In some embodiments, the collection chamber 11b may contain air or another gas. Optionally, the collection chamber 11b may also contain liquid, such as a cooling medium, or a component for accommodating the liquid is provided to further lower the temperature of the emissions entering the collection chamber 11b. Further, optionally, the gas or the liquid in the collection chamber 11b flows in a circulating manner. In the case where there is provided the avoidance chamber 134a as described above, the avoidance chamber 134a may be isolated from the collection chamber 11b by the thermal management component 13. The so-called "isolation" here refers to separation, which may not be sealed. This can be more conducive for the emissions to break through the side avoidance wall 134c such that the fluid flows out, so as to further lower the temperature of the emissions and extinguish fire, thereby improving the safety performance of the battery. In addition, in the case where the avoidance structure 134 is a through hole as described above, the avoidance chamber 134a and the collection chamber 11b may be in communication with each other. This approach is more conducive to the discharge of the emissions, so as to avoid potential safety hazards caused by secondary high pressure.

In some embodiments, the collection chamber 11b may also be an open cavity outside the thermal management component 13. For example, in an embodiment where the thermal management component 13 is used as the bottom portion of the case shell 112 of the case 11, the emissions from the battery cell 20 can be directly discharged to the space outside the thermal management component 13, that is, outside the case 11, after passing through the thermal management component 13, so as to avoid the generation of secondary high pressure. In some alternative embodiments, the battery 10 may further include a protective member 115, as shown in FIG. 7. The protective member 115 in the present application refers to a component arranged on the side of the thermal management component 13 away from the battery cell 20 to provide protection for the thermal management component 13 and the battery cell 20. In these embodiments, the collection chamber 11b may be arranged between the protective member 115 and the thermal management component 13.

In some embodiments, the protective member 115 may be a part installed at the bottom of the case 11 to play a protective role. This approach helps promote more diversified designs for the application areas or spaces of the battery 10, such as electric vehicles. For example, for some electric vehicles, in order to reduce the manufacturing cost and therefore the price of the final product, the protective member 115 may not be provided without affecting the use. Users can choose whether to install a protective member 115 according to their needs. In this case, the collection chamber 11b constitutes the open cavity mentioned above, and the emissions from the battery cell 20 can be directly discharged to the outside of the battery 10.

In some embodiments, the protective member 115 may be the bottom portion 112a of the case shell 112 of the case 11. For example, the thermal management component 13 may be assembled to the protective member 115 as the bottom portion 112a of the case shell 112. The thermal management component 13 is assembled to the protective member 115 with a gap between the two to form the collection chamber 11b. In this case, the collection chamber 11b may be used as a buffer chamber for the emissions from the battery cell 20. When at least one of the temperature, volume, or pressure of the emissions in the collection chamber 11b reaches a predetermined level or threshold, the protective member 115 may be partially damaged to release the pressure in the collection chamber 11b in a timely manner. In some alternative embodiments, alternatively or additionally, a sealing member (such as a sealing ring, a sealant, etc.) may be provided between the protective member 115 and the thermal management component 13 to seal the collection chamber 11b, wherein the sealing member may also be partially damaged when at least one of the temperature, volume, or pressure of the emissions in the collection chamber 11b reaches a predetermined level or threshold, to release the pressure in the collection chamber 11b in a timely manner, avoiding secondary damage.

In some alternative embodiments, the protective member 115 may also be formed integrally with the thermal management component 13. For example, on the outside of the thermal management component 13, a thermal protective member 115 is also integrally formed, and there is a spacing between the protective member 115 and the thermal management component 13 to form the collection chamber 11b. The protective member 115 may be provided with a weakened structure, such that when the temperature, volume, or pressure of the emissions in the collection chamber 11b reaches a predetermined level or threshold, the protective member 115 can be partially damaged to release the pressure of the collection chamber 11b in a timely manner. This approach can further reduce the number of components, and therefore reduce the assembly time and assembly cost.

FIGS. 9 to 12 respectively show views from different angles, a cross-sectional view and an exploded view of the thermal management component 13 according to some embodiments of the present application. As shown in the figures, in some embodiments, a semi-recess structure corresponding to the flow channel 133 may be formed on the first thermally conductive plate 131 and the second thermally conductive plate 132, respectively, and the semi-recess structures of the first thermally conductive plate 131 and the second thermally conductive plate 132 are aligned with each other. By assembling the first thermally conductive plate 131 and the second thermally conductive plate 132 together, the semi-recess structures of the first thermally conductive plate 131 and the second thermally conductive plate 132 are combined into the flow channel 133, and finally the thermal management component 13 is formed.

Of course, it should be understood that the specific structure of the thermal management component 13 described above is only illustrative and is not intended to limit the scope of protection of the present application. Any other suitable structure or arrangement is also possible. For example, in some alternative embodiments, at least one of the first thermally conductive plate 131, the second thermally conductive plate 132, and the flow channel 133 may be omitted. For example, the second thermally conductive plate 132 may be omitted. That is to say, in some embodiments, the thermal management component 13 may only include the first thermally conductive plate 131 and the flow channel 133 arranged on one side thereof or embedded therein.

It can be seen from the above description that, in some embodiments, in the case where the pressure relief mechanism 213 is arranged on a different side relative to the bus component 12 of the battery cell 20, a dual-chamber structure can be formed after structural adjustment. The dual-chamber refers to the avoidance chamber 134a between the pressure relief mechanism 213 of the battery cell 20 and the avoidance structure 134, and the collection chamber 11b mentioned above, as shown in FIG. 8. The dual-chamber structure can effectively ensure that the emissions from the battery cell 20 can be discharged in a controlled, orderly and timely manner when the pressure relief mechanism 213 is actuated. In addition, in some embodiments, the avoidance chamber 134a may also be damaged to allow the fluid to flow out of the thermal management component 13, cooling the emissions from the battery cell 20 and extinguishing fire, thereby quickly lowering the temperature of the emissions from the battery cell 20, and thus improving the safety performance of the battery 10.

In addition, by arranging the pressure relief mechanism 213 on the side different from the bus component 12 of the battery cell 20, no emissions or a small amount of emissions from the battery cell 20 will enter the electrical chamber 11a formed in the case 11. This is particularly advantageous for ensuring the electrical safety and avoiding a short circuit between bus components 12. Based on this separate structure of the electrical chamber 11a and the dual-chamber structure mentioned above, the cover body 111 of the case 11 can be designed to be closer to the bus component 12. This is because the emissions from the battery cell 20 will be discharged into the avoidance chamber 134a and/or the collection chamber 11b, and it is possible to not provide the electrical chamber 11a part with a channel for the circulation of the emissions, so that the cover body 111 can be closer to the bus component 12, even in contact with the bus component 12. This can make the upper structure of the battery 10 more compact and increase the effective space of the battery 10 for accommodating the battery cells 20, thereby increasing the volumetric energy density of the battery 10.

Specifically, in the conventional battery 10, especially when the battery cell 20 uses a ternary lithium-ion battery cell, not to mention the contact between the cover body 111 and the bus component 12, it is basically impossible to set the distance between the two to be less than 7 mm. This is because in the conventional battery cell 20, the bus component 12 and the pressure relief mechanism 213 are both provided on the same side of the battery cell 20, in order to ensure that the pressure relief mechanism 213 can be normally opened when the pressure relief mechanism 213 is actuated such that the emissions from the battery cell 20 can be smoothly discharged and circulated, the distance between the bus component 12 and the cover body 111 is generally set to 7 mm or more than 7 mm to ensure the safety of the battery 10.

Figure 14:
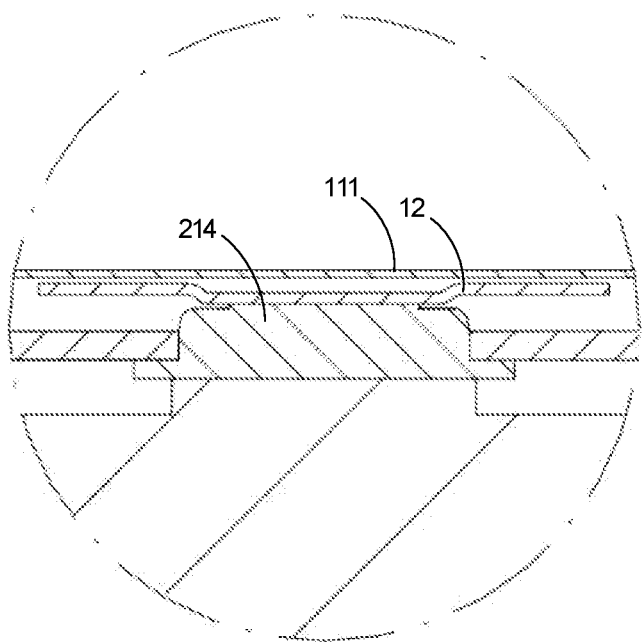
FIG. 14 shows an enlarged view of a part C of the battery shown in FIG. 7.
Figure 15:
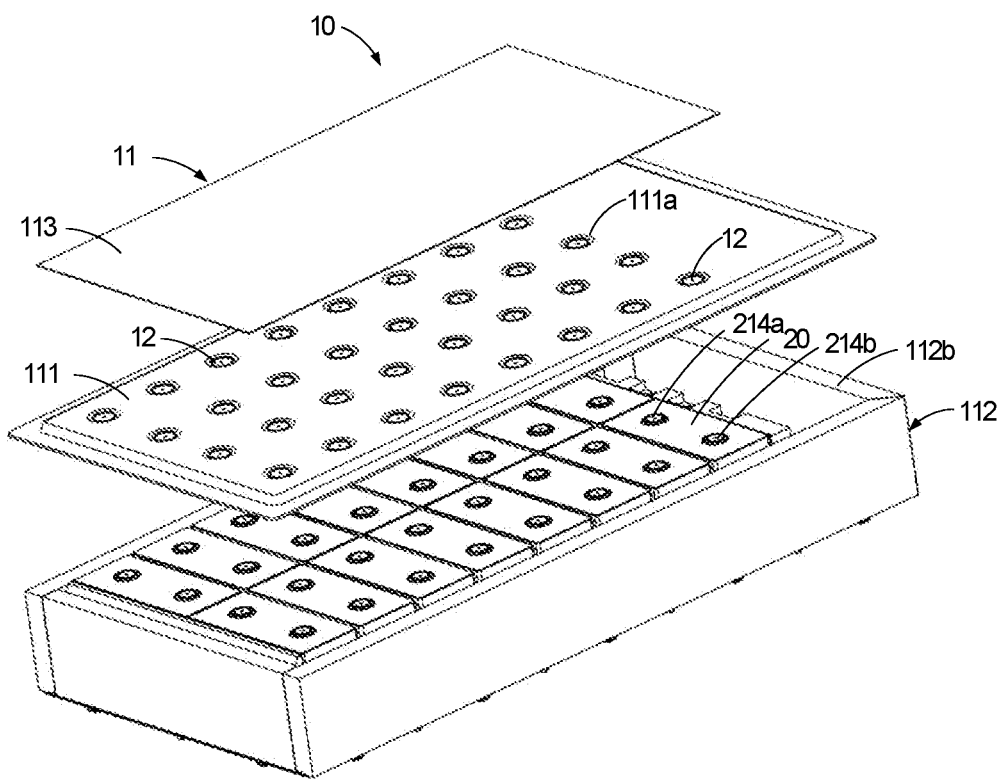
FIG. 15 shows an exploded view of a battery according to some embodiments of the present application.

Different from the conventional battery 10, after the pressure relief mechanism 213 and the bus component 12 are provided on different sides of the battery cell 20, since the emissions from the battery cell 20 are discharged into the avoidance chamber 134a and/or the collection chamber 11b, there is no need to reserve a position required for providing the pressure relief mechanism 213 on the cover plate of the battery cell 20, and the electrical chamber 11a part may not need to be provided with a channel for the circulation of the emissions, so that the cover body 111 and the bus component 12 can be arranged adjacent to each other and the distance between the two may be less than 2 mm, as shown in FIG. 14. A gap of this size is quite beneficial to the development of the battery technology. Specifically, with the development of the battery technology up to now, it would be very difficult to reduce the size of each structure and component of the battery 10 except the space for accommodating the battery cells 20 by 1 mm while ensuring the safety. Therefore, by arranging the pressure relief mechanism 213 and the bus component 12 on different sides of the battery cell 20, the structural compactness of the battery 10 can be significantly improved, and the effective accommodating space 111a for the battery cells can be increased rationally, thereby increasing the volumetric energy density of the battery 10.

Figure 18:
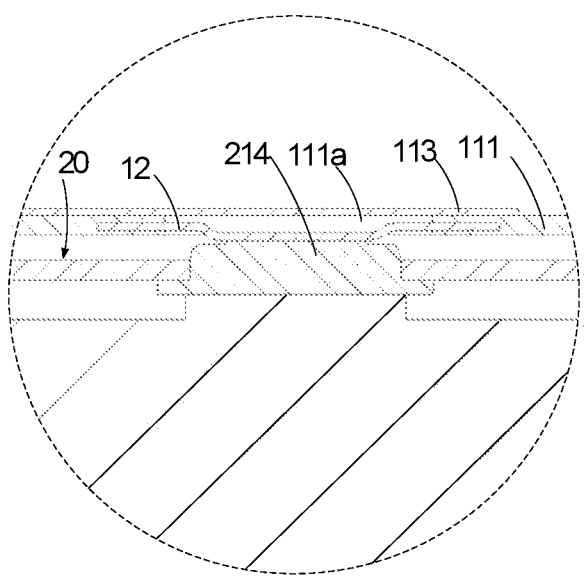
FIG. 18 shows an enlarged view of a part A of the battery shown in FIG. 17.
Figure 19:
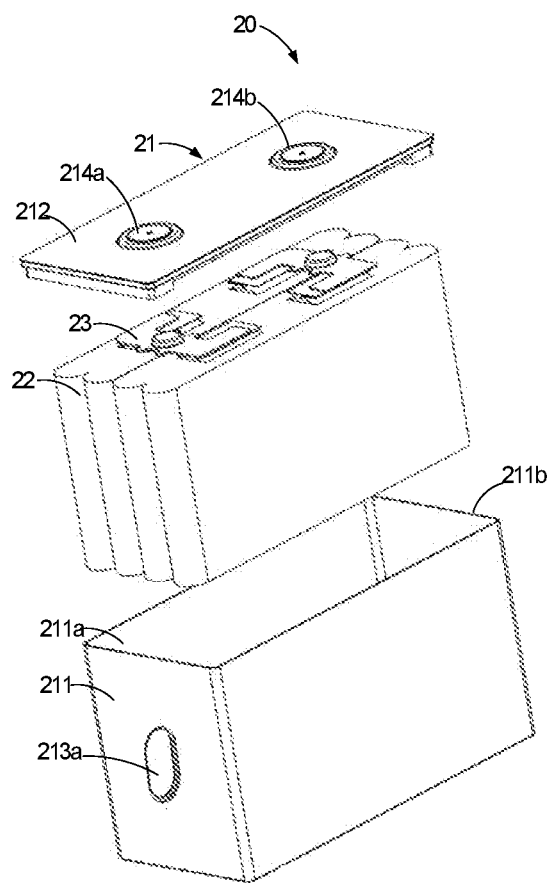
FIG. 19 shows an exploded view of a battery cell according to some embodiments of the present application.

In some embodiments, the bus component 12 may also be embedded in the cover body 111. FIGS. 15 to 18 show schematic diagrams of bus components 12 embedded in the cover body 111. As shown in the figures, in some embodiments, the cover body 111 may include an accommodating space 111a. The accommodating space 111a can accommodate the bus components 12. In some embodiments, the accommodating space 111a may be through holes formed in the cover body 111. The bus components 12 may be fixed in the through holes by means of an appropriate method. For example, the bus components 12 may be mounted into a mold before the cover body 111 is molded, so that after the cover body 111 is formed, the bus components 12 can be embedded in the cover body 111, as shown in FIG. 18.

It should be understood that the bus components 12 are arranged in the cover body 111 at positions corresponding to the electrode terminals 214 of the battery cells 20. After the battery cells 20 in the case 111 are placed in place, the cover body 111 can be directly assembled to the case shell 112, and the bus components 12 are then electrically connected to the electrode terminals 214 of the battery cells 20 by means of welding such as laser welding or ultrasonic welding, and other fixing methods. Thereafter, an insulating portion 113 attached to the cover body 111 is used to at least cover the bus components 12, thereby forming a packaged case 11.

In some embodiments, the insulating portion 113 may have a sheet-like or thin-plate-like structure, and the material of the insulating portion 113 may be PP, PE, PET, etc. In some other embodiments, the insulating portion 113 may also be an insulating glue or an insulating paint, etc.

In some embodiments, the insulating portion 113 may be applied to or assembled to the cover body 111. For example, after the bus components 12 are electrically connected to the electrode terminals 214 of the battery cells 20, the insulating portion 113 may be formed by coating an insulating layer on the portion of the cover body 111 having the bus component 12. In some alternative embodiments, the insulating portion 113 may also be a component assembled to the cover body 111 to cover at least the insulating portion 113. The insulating portion 113 and the cover body 111 may be hermetically assembled to ensure the tightness of the case 11. In some embodiments, the coated insulating layer or the assembled insulating portion 113 may also cover the entire outer surface of the cover body 111.

In some embodiments, the insulating portion 113 may also be integrally formed with the cover body 111. For example, the insulating portion 113 may be formed as a portion of the cover body 111 protruding from the outer surface, and an accommodating space 111a is formed inside the portion to accommodate the bus components 12. In these embodiments, the bus components 12 may also be embedded into the cover body 111 by means of molding, etc. or may be assembled into the cover body 111 in a late period after the cover body 111 is formed. In the case mentioned later, the bus components 12 may be electrically connected to the electrode terminals 214 of the battery cells 20 by means of resistance welding, etc.

For the conventional battery 10, this way of embedding the bus components 12 into the cover body 111 is basically impossible. This is because as mentioned above, the pressure relief mechanism 213 of the battery cell 20 in the conventional battery 10 is provided on the same side as the bus component 12, if the bus components 12 are embedded in the cover body 111, the emissions from the battery cells 20 has nowhere to circulate, causing more serious safety accidents.

According to the arrangement of embedding the bus components 12 into the cover body 111 described in the above embodiment, the volume of the battery 10 can be greatly reduced without affecting the safety of the battery 10 or even improving the safety of the battery 10, thereby increasing the volumetric energy density of the battery 10. In addition, this approach can also reduce the assembly difficulty of the battery 10, thereby reducing the assembly cost. Furthermore, embedding the bus components 12 into the cover body 111 can also realize a battery management unit 15 being at least partially arranged outside the electrical chamber 11a mentioned above.

Specifically, for a conventional battery, the components in the electrical chamber 11a need to be properly connected before the cover body 111 and the case shell 112 are sealed. The connection includes the connection between the bus components 12 and the electrode terminals 214 and the connection between the battery management unit 15 and the bus components 12. That is to say, in the conventional battery, the battery management unit 15 is packaged within the sealed case 11. However, the battery management unit 15 is a vulnerable component compared to other components. One needs to open the sealed case 11 to replace the battery management unit 15 after it is damaged or malfunctions. This operation is time-consuming and laborious, and also affects the tightness of the case 11.

Figure 16:
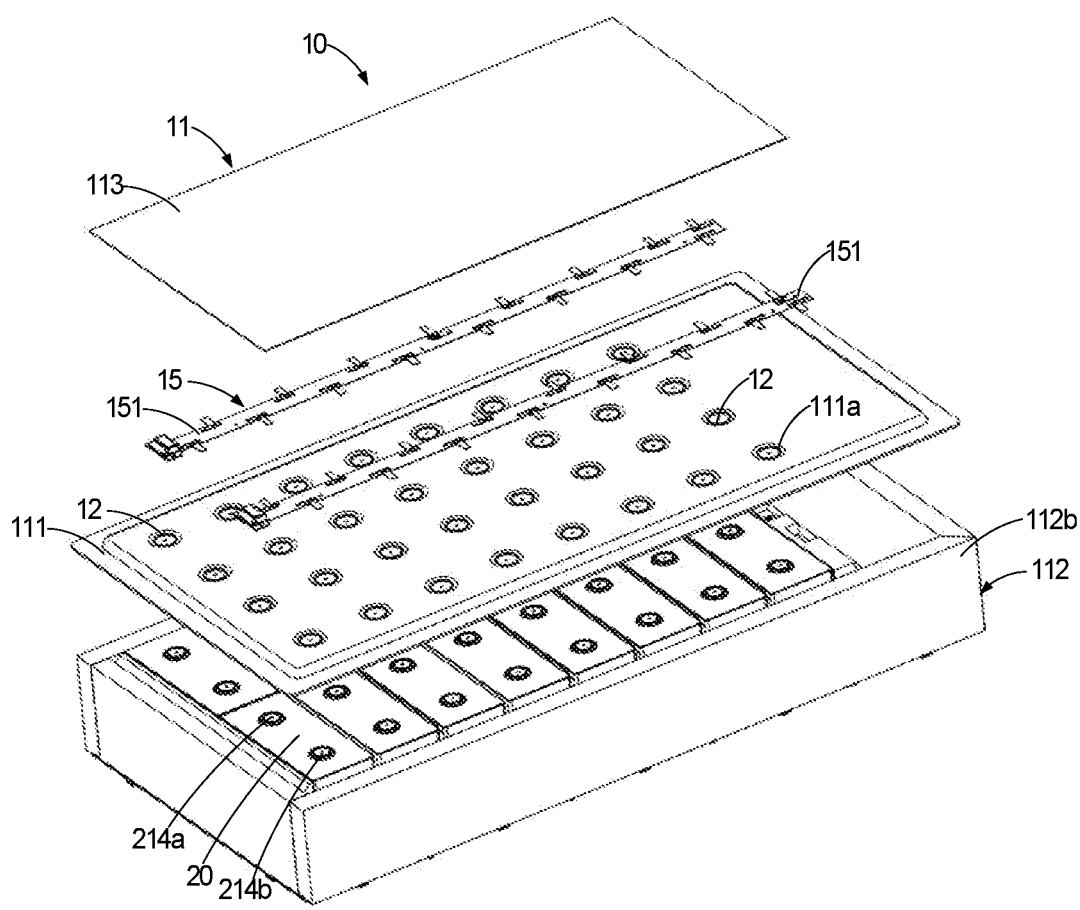
FIG. 16 shows an exploded view of a battery according to some embodiments of the present application.
Figure 17:
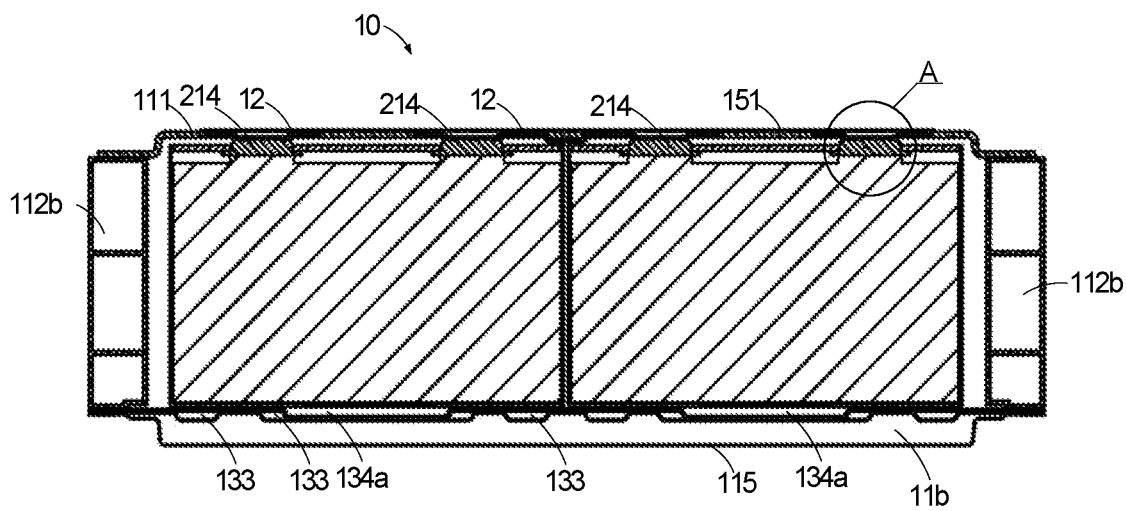
FIG. 17 shows a cross-sectional side view of a battery according to some embodiments of the present application.

Different from the conventional battery, in the case where the bus component 12 is embedded in the cover body 111, the battery management unit 15 can be arranged at least partially outside the electrical chamber 11a. For example, at least one of electrical connection portions 151 between a control portion (not shown) of the battery management unit 15 and a bus component 12 can also be embedded in the cover body 111, as shown in FIG. 16. The control portion can be accommodated in an accommodating portion integrated with the cover body 111. In this case, after the failure of the control portion or the electrical connection portion 151 of the battery management unit 15, the repair can be carried out without opening the case 11. In this way, it can ensure that the sealing of the case 11 is not affected while the maintenance cost is reduced, thus improving the safety performance and user experience of the battery. In some embodiments, the electrical connection portion 151, for example, may include but is not limited to at least one of the following: a circuit board (such as a printed or flexible circuit board), a cable, a wire, a conducting sheet or a conducting bar, etc. The electrical connection portion 151 is used for electrical connection with a plurality of battery cells 20 to collect temperature or voltage signals of the plurality of battery cells 20.

Figure 20:
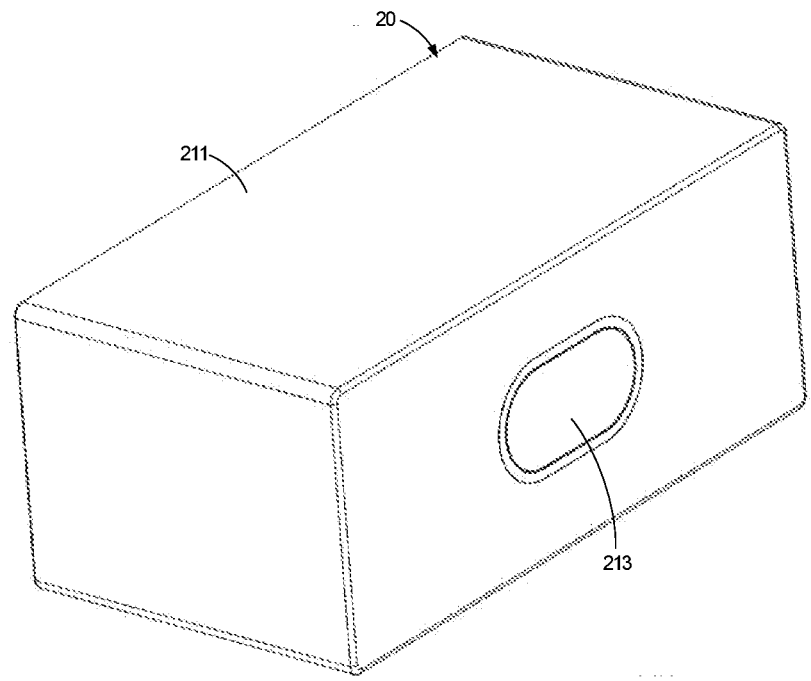
FIG. 20 shows a perspective view of a battery cell according to some embodiments of the present application.
Figure 21:
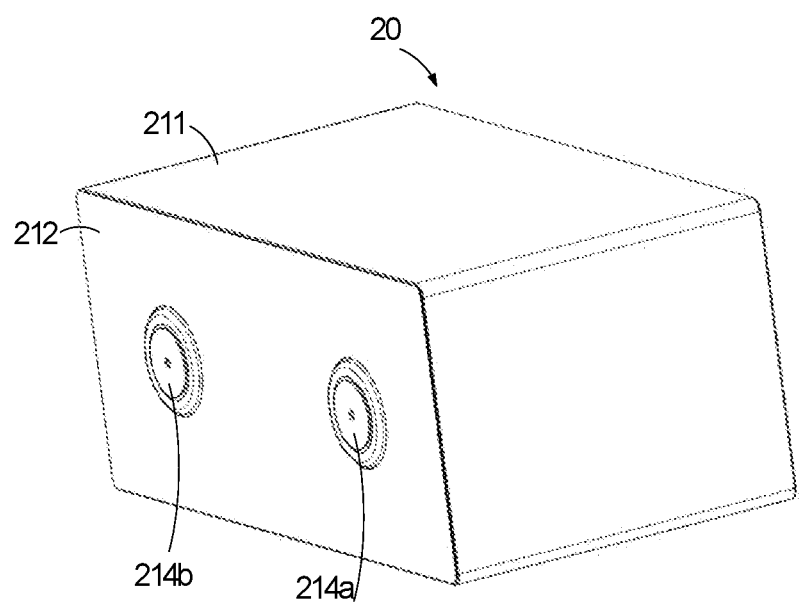
FIG. 21 shows a perspective view of the battery cell shown in FIG. 20 from another angle.
Figure 22:
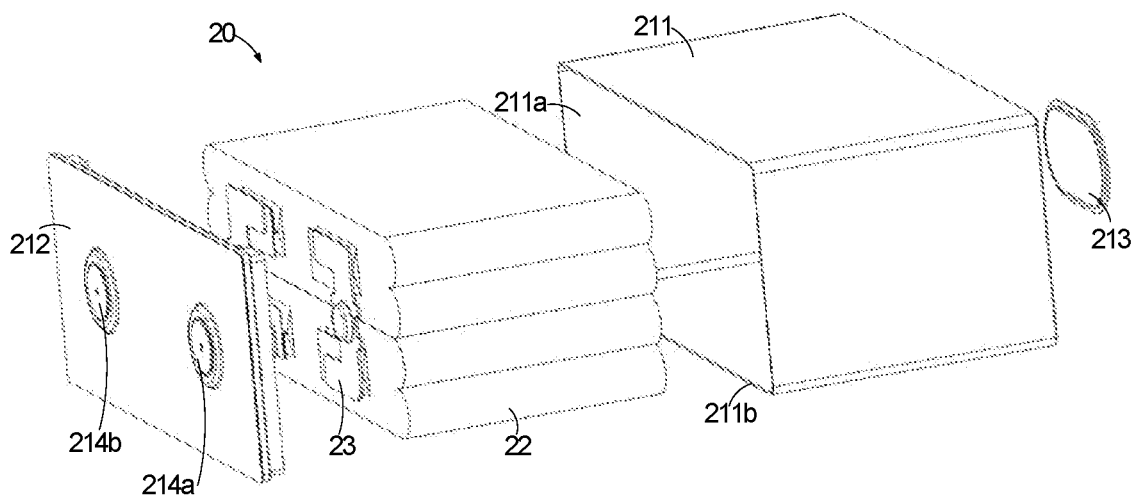
FIG. 22 shows an exploded view of the battery cell shown in FIG. 21.

The concept of the present application is described mainly by taking the pressure relief mechanism 213 and the thermal management component 13 as examples, which are provided at the bottom of the battery cell 20 (i.e., the side of the battery cell 20 opposite the bus component 12). It should be understood that the pressure relief mechanism 213 and the thermal management component 13 can also be arranged on the side of the battery cell 20, whether the battery cell 20 is placed vertically, horizontally, laterally (in a lying manner) or upside down in the case 11, as shown in FIGS. 19 to 26. The term "vertically" in the present application means that the battery cell 20 is installed in the case 11 in such a way that the cover plate 212 is adjacent to and approximately parallel to the cover body 111, as shown in FIGS. 2-7, 15-17, 19 and 23. Similarly, the term "horizontally placed" or "laterally placed" means that the battery cell 20 is installed in the case 11 in such a way that the cover plate 212 is approximately perpendicular to the cover body 111, as shown in FIGS. 20 to 22. The term "upside down" means that the battery cell 20 is installed in the case 11 in such a way that the cover plate 212 is adjacent to and approximately parallel to the bottom portion of the case shell 112.

In order to cover these cases, the concepts of a first wall and a second wall of the battery cell 20 and a support component 16 of the battery 10 are introduced in the following description. The first wall and the second wall are two intersecting walls in the battery cell 20. As long as the first wall and the second wall can intersect, they can be any appropriate wall of the battery cell 20 mentioned above, including a side wall, a bottom wall and the cover plate 212. The support component 16 of the battery 10 refers to the component configured to support the battery cell 20, which support component 16 can be the thermal management component 13, the bottom portion 112*a* of the case shell 112, or the protective member 115 mentioned above, etc. Of course, the support component 16 can also be the component which is arranged only on the inner side of the case shell 112 to support the battery cell 20.

Figure 23:
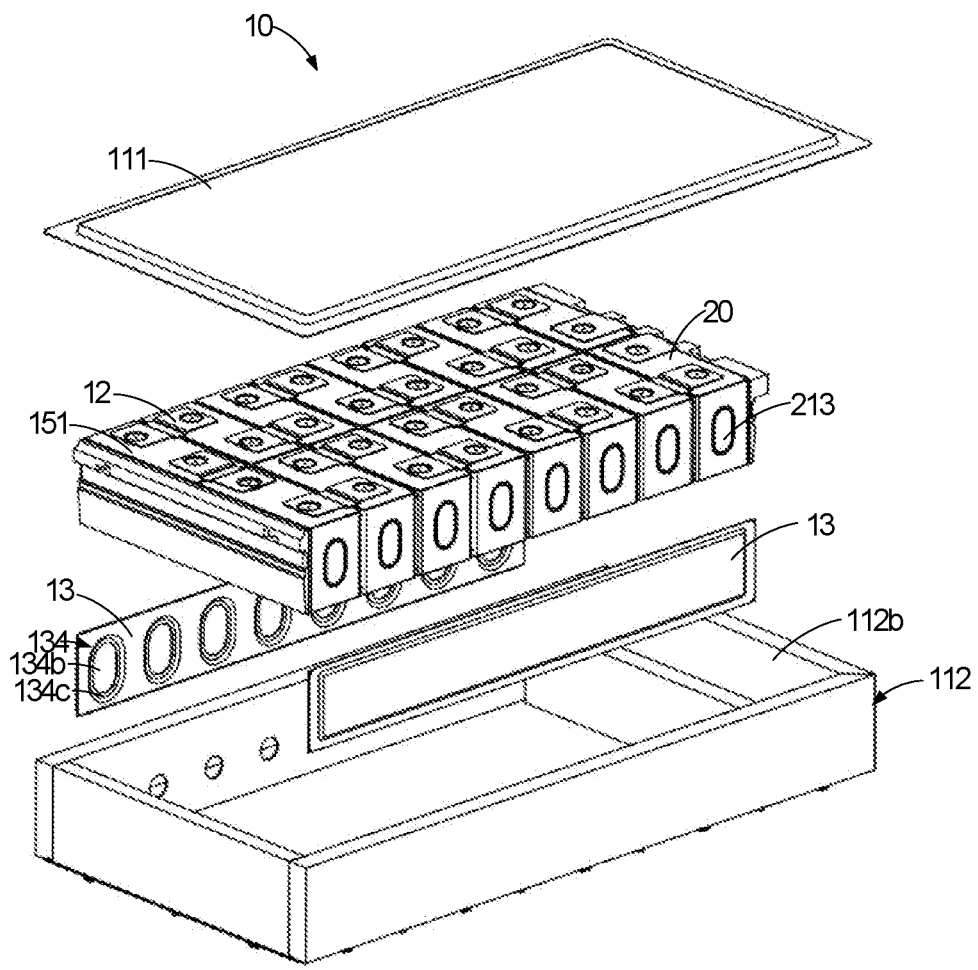
FIG. 23 shows an exploded view of a battery according to some embodiments of the present application.
Figure 24:
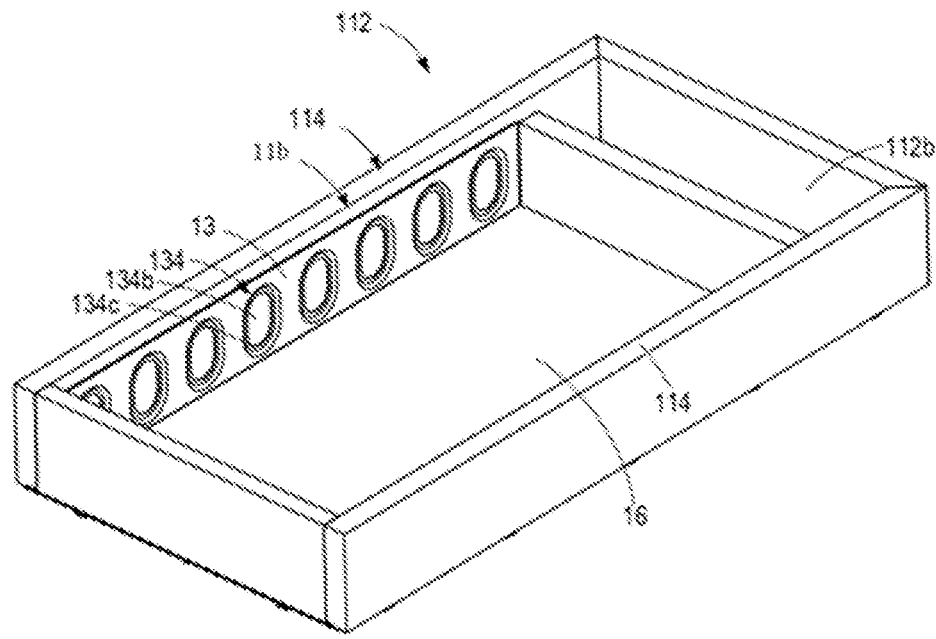
FIG. 24 shows a perspective view of a case shell part of a case of a battery according to some embodiments of the present application.

In some embodiments, the pressure relief mechanism 213 can be arranged on the first wall of the battery cell 20, and the thermal management component 13 is attached to the first wall, as shown in FIGS. 23 and 24. In some embodiments, the pressure relief mechanism 213 can be arranged such that its outer surface is flush with an outer surface of the first wall. This flush arrangement is more conducive to the attachment between the first wall and the thermal management component 13. In some alternative embodiments, the outer surface of the pressure relief mechanism 213 can also be arranged to be recessed into an outer surface of the first wall. This recessed structure can provide a part of the avoidance space, thus reducing or even omitting the avoidance structure 134 in the thermal management component 13, for example.

In addition, the support component 16 is attached to the second wall to support the battery cell 20 in an opposite direction of gravity. It can be seen that the pressure relief mechanism 213 and the thermal management component 13 are provided on the first wall of the battery cell 20 that is parallel to the direction of gravity, regardless of how the battery cell 20 is placed in the case 11. For example, in the case where the battery cell 20 is placed vertically or upside down in the case 11, the first wall is the side wall of the battery cell 20, while in the case where the battery cell 20 is horizontally placed in the case 11, the first wall can be the cover plate 212 or the wall opposite the cover plate 212. For ease of description, some embodiments are described below with the pressure relief mechanism 213 and the thermal management component 13 being arranged on the side or the first wall of the battery cell 20.

In the embodiments of the pressure relief mechanism 213 and the thermal management component 13 arranged at the side of the battery cell 20, the structural features and properties of the thermal management component 13 are also the same as those arranged at the bottom of the battery cell 20, such as the avoidance chamber 134*a*, the through hole, etc., which will not be described further below. In addition, in the case where the pressure relief mechanism 213 and the thermal management component 13 are arranged on the side of the battery cell 20, the battery 10 can also include the collection chamber 11*b*. Moreover, the collection chamber 11*b* can also be configured, when the pressure relief mechanism 213 is actuated, to collect emissions from the battery cell 20 and the thermal management component 13.

Figure 25:
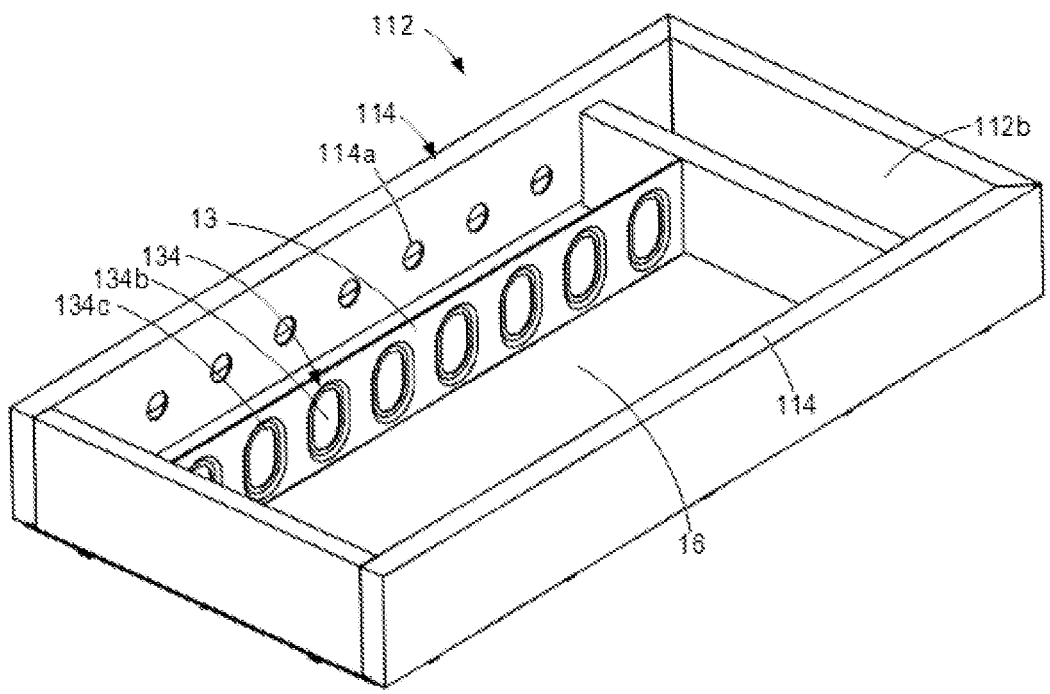
FIG. 25 shows a perspective view of a case shell part of a case of a battery according to some embodiments of the present application.
Figure 26:
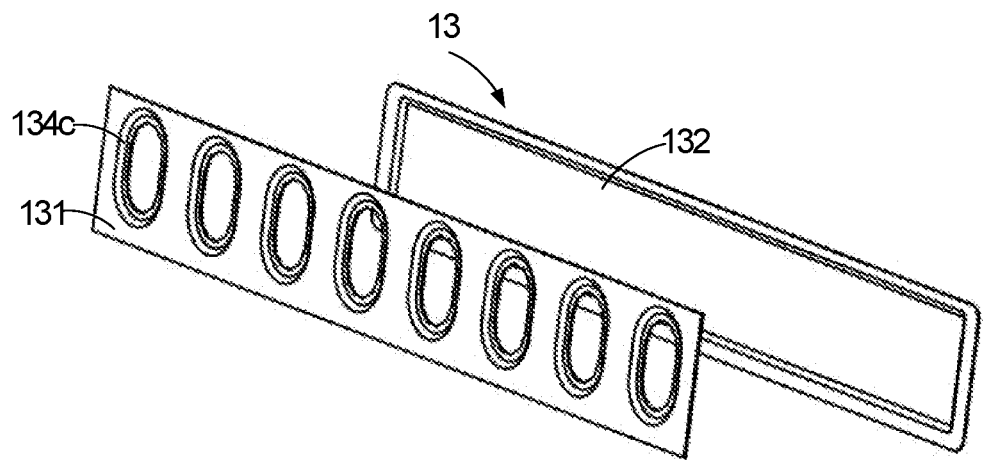
FIG. 26 shows an exploded view of a thermal management component according to some embodiments of the present application.

In some embodiments, the collection chamber 11*b* can be composed of at least part of the side portion 112*b* of the case shell 112, as shown in FIGS. 24 and 25. For example, the side portion 112*b* can be constructed as a hollow structure, and the hollow structure constitutes the collection chamber 11*b*, which can make the battery 10 lightweight while making the battery 10 more compact. The thermal management component 13 can be arranged between the side portion 112*b* and the battery cell 20. In some embodiments, the part of the side portion 112*b* corresponding to the avoidance structure 134 can be provided with a weak structure, a through hole (a through hole 114*a* as shown in FIG. 25) or the relief mechanism mentioned above, such as the pressure relief mechanism 213, so that the emissions from the battery cell 20 easily enter the collection chamber 11*b*.

Additionally or alternatively, in some embodiments, the collection chamber 11*b* can also be composed of a beam 114 arranged to extend between the cover body 111 and the case shell 112. The beam 114 extends from the bottom portion of the case shell 112 to the cover body 111 in a direction perpendicular to the bottom portion. The thermal management component 13 can be arranged between the beam 114 and the battery cell 20. In some embodiments, the beam 114 can have a hollow structure, and a hollow space of the beam 114 can constitute the collection chamber 11*b*. In some embodiments, the part of the beam 114 corresponding to the avoidance structure 134 can be provided with a weak structure, a through hole (a through hole 114*a* as shown in FIG. 25) or the relief mechanism mentioned above, such as the pressure relief mechanism 213, so that the emissions from the battery cell 20 easily enter the collection chamber 11b.

In some embodiments, the side portion 112b of the case shell 112 and the beam 114 may be the same component.

In some embodiments, the support component 16 can also include an additional collection chamber (not shown in the figures), and the additional collection chamber can be communicated to the collection chamber 11b to accommodate the emissions from the battery cell 20. The additional collection chamber can also provide a greater cooling area for the emissions, so that the emissions can be effectively cooled in the battery 10 before being discharged, thus improving the safety performance of the battery 10.

In addition, in some embodiments, the support component 16 can also include an additional flow channel (not shown in the figures) that can be communicated to the flow channel 133 in the thermal management component 13 so that the fluid can flow in the flow channel 133 of the thermal management component 13 and in the additional flow channel of the support component 16. In this way, the battery cell 20 can be cooled at the bottom and the side, thus improving the cooling effect of the battery cell 20. The communication between the additional flow channel and the flow channel 133 can be controllable. For example, when the temperature of the battery cell 20 is at a normal level, the communication between the additional flow channel and the flow channel 133 can be closed. When the temperature of the battery cell 20 reaches a certain degree or a predetermined threshold, for example, when the temperature exceeds 50° C., the additional flow channel and the flow channel 133 can be communicated, so that the fluid can cool the battery cell 20 in multiple directions of the battery cell 20, thus improving the cooling effect.

In some embodiments, the thermal management component 13 can also be integrated with the support component 16. For example, the thermal management component 13 and the support component 16 form an L-shaped, T-shaped or U-shaped structure, etc. In this way, the structural strength of the battery can be improved. In some alternative embodiments, the support component 16 can also be secured to the thermal management component 13 in an appropriate manner. This approach facilitates the manufacturing of the support component 16 and the thermal management component 13 and thus reduces the manufacturing cost.

In order to improve the temperature adjustment function of the thermal management component 13, whether the thermal management component 13 is arranged on the side or the bottom of the battery cell 20, the thermal management component 13 and the battery cell 20 can be bonded together by means of thermally conductive silicone. The thermally conductive silicone can not only provide a bonding force required by the combination of the thermal management component 13 and the battery cell 20, but can also facilitate the conduction of heat between the thermal management component 13 and the battery cell 20, so as to facilitate the temperature adjustment of the thermal management component 13 to the battery cell 20.

Figure 27:
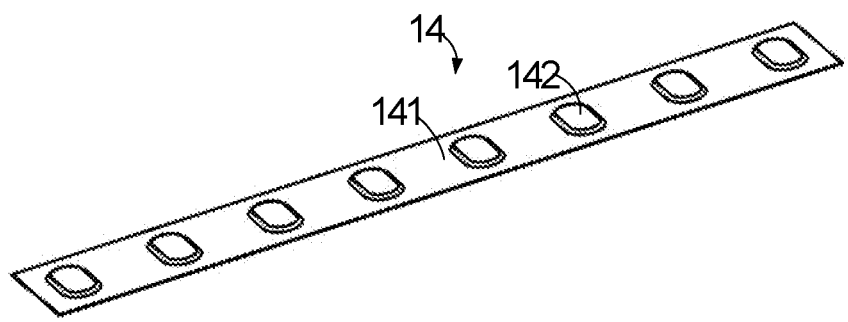
FIG. 27 shows a perspective view of an isolation component according to some embodiments of the present application.
Figure 28:
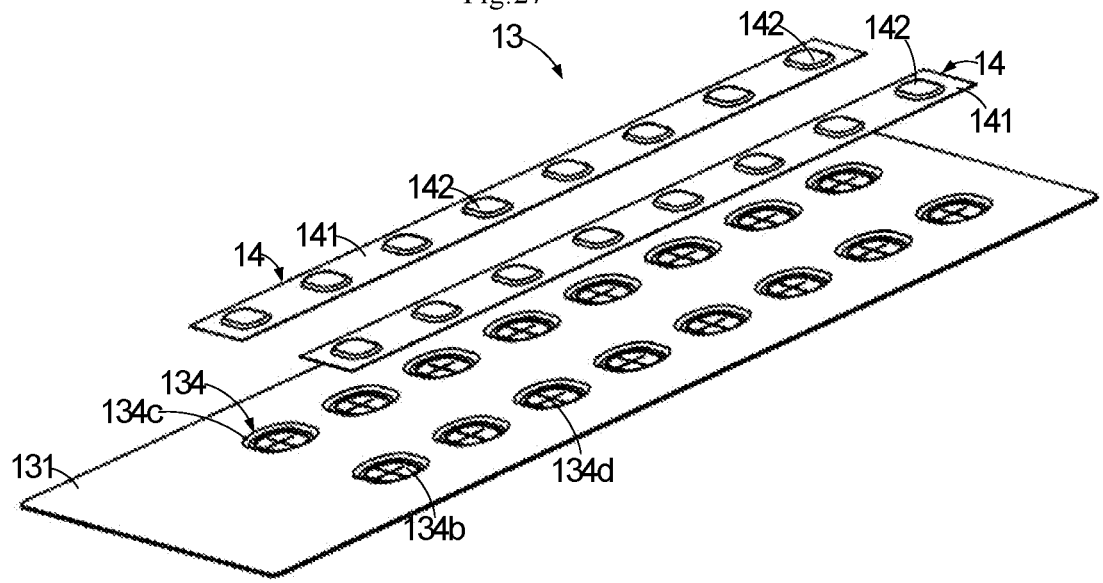
FIG. 28 shows an exploded view of the isolation component according to some embodiments of the present application that is not yet attached to the thermal management component.
Figure 29:
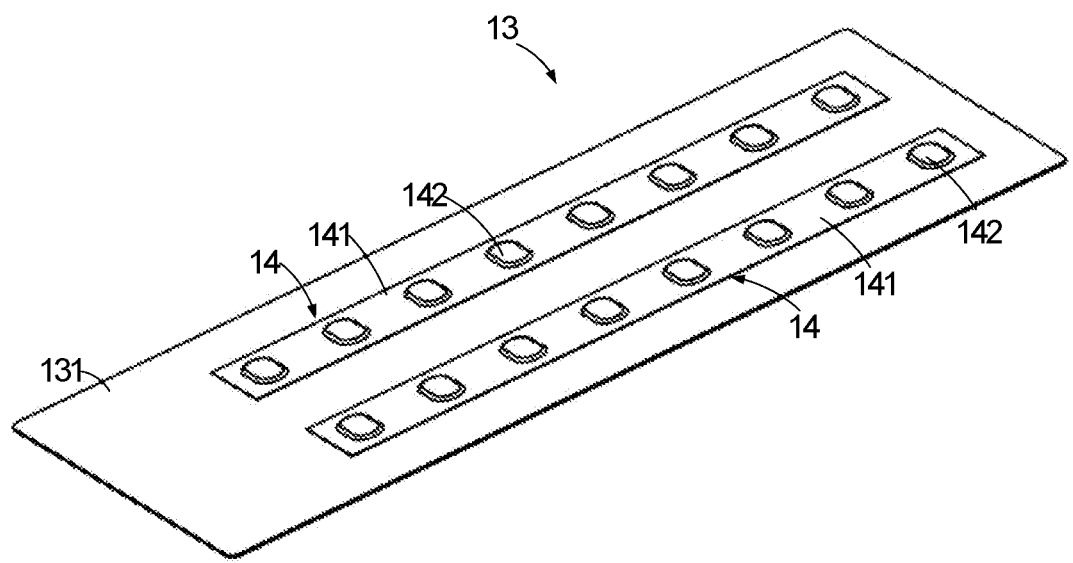
FIG. 29 shows an exploded view of the isolation component according to some embodiments of the present application that has been attached to the thermal management component.

In order to avoid affecting the actuation of the pressure relief mechanism 213 by applying adhesives such as thermally conductive silicone between the thermal management component 13 and the pressure relief mechanism 213, in some embodiments, the battery 10 can also include an isolation component 14. FIG. 27 shows a perspective view of the isolation component 14, FIG. 28 shows an exploded view of the isolation component 14 and the thermal management component 13 not assembled together, and FIG. 29 shows a perspective view of the isolation component 14 and the thermal management component 13 attached together. It can be seen that the isolation component 14 can be attached to the thermal management component 13 before the adhesive is coated and make special structural features thereon correspond at least to the pressure relief mechanism 213 or the avoidance structure 134. In this way, when the adhesive is coated, the adhesive will not enter or in a small amount enter the region, corresponding to the pressure relief mechanism 213 or the avoidance structure 134, of the thermal management component 13, so as to ensure that the pressure relief mechanism 213 can be actuated and will not block the avoidance structure 134. In addition, the use of the isolation component 14 can also speed up the adhesive coating speed and accuracy, and save production time and costs.

It should be noted that the above is only an example to describe that the isolation component 14 can be arranged between the battery cell 20 and the thermal management component 13 to prevent the adhesive from being applied between the thermal management component 13 and the pressure relief mechanism 213. It should be understood that any other appropriate component, such as the support component 16 mentioned above, can be bonded to the battery cell 20 by the adhesive. That is to say, the isolation component 14 can be used for any component that requires the adhesive to be bonded to the battery cell 20. For ease of description, the component below that requires the adhesive to be bonded to the battery cell 20 will be referred to as an attachment component. The attachment component refers to the component attached to the battery cell 20 by the adhesive, which may include but is not limited to: the thermal management component 13 or the support component 16, etc. The adhesive can be thermally conductive silicone, epoxy resin adhesive, polyurethane adhesive, etc. By providing the isolation component 14 between the attachment component and the battery cell 20, the adhesive can be prevented from being applied between the attachment component and the pressure relief mechanism 213.

In some embodiments, the isolation component 14 can include a main body 141 and a protrusion 142. The main body 141 is suitable for attachment to the attachment component. The protrusion 142 protrudes outward from the surface of the main body 141, and the protrusion 142 is constructed to align with the pressure relief mechanism 213 in a protruding direction if the main body 141 is attached to the attachment component, and the peripheral size of the protrusion 142 is greater than or equal to that of the pressure relief mechanism 213. In this way, when the adhesive is coated, an adhesive coating machine can be guided to carry out an adhesive coating operation according to a predetermined path, and it can also ensure that the adhesive will not be coated to the position where the pressure relief mechanism 213 is located, thus ensuring that the adhesive can be coated to an appropriate position efficiently and accurately.

In some embodiments, the height of the protrusion 142 can be greater than or equal to a predetermined application height of the adhesive, which can ensure that no or a small amount of adhesive will enter the region between the pressure relief mechanism 213 and the attachment component when the adhesive is applied, which is particularly advantageous especially in the case where the avoidance structure 134 is provided in the attachment component. In addition, the protrusion 142 is also constructed such that it can be compressed to the same height as the adhesive if the battery cell 20 is attached to the attachment component, thus ensuring the connection between the attachment component and the battery cell 20. In addition, the isolation component 14 shall also be made of a material that is susceptible to damage by the emissions from the battery cell 20 so that the emissions can easily break through the isolation component 14. That is to say, the protrusion 142 or the entire isolation component 14 can be made of a material or structure that is flexible and have a low breakdown strength. For example, in some embodiments, the isolation component 14 can be made of a thermoplastic material by a blister process. In addition, the wall thickness of the isolation component 14 can be between 0.01 mm and 0.05 mm.

Since a plurality of battery cells 20 are generally attached in rows to the attachment component, in some embodiments, a plurality of isolation components 14 for the plurality of battery cells 20 can be an integrally formed whole sheet. For example, the isolation components 14 arranged in one or more rows can be integrally made by means of blister forming. Moreover, the positions of the plurality of isolation components 14 arranged in rows respectively correspond to the positions of the pressure relief mechanism 213 of the plurality of battery cells 20, so that the isolation components 14 can be reliably configured to protect the pressure relief mechanism 213 to attach the battery cells 20 to the attachment component.

It should be understood, of course, that the above embodiments of the isolation component 14 using the protrusion 142 to prevent the adhesive from being applied between the attachment component and the pressure relief mechanism 213 are just schematic and are not intended to limit the scope of protection of the present application, and any other appropriate arrangement or structure is also possible. For example, in some alternative embodiments, the isolation component 14 can also be constructed without the protrusion 142, but only with a special coating at the location corresponding to the pressure relief mechanism 213 to prevent the adhesive from being applied between the attachment component and the pressure relief mechanism 213.

It can be seen that the isolation component 14 can be used between the attachment component and the battery cell 20 to prevent the adhesive from being applied between the attachment component and the pressure relief mechanism 213. In addition, more advanced automatic means can be configured to guide the adhesive coating operation, so that an operator does not have to be careful to operate. In this way, the application efficiency of the adhesive is effectively improved, thus reducing the assembly cost of the battery 10. At the same time, it can effectively prevent the adhesive from being applied between the attachment component and the pressure relief mechanism 213, which is conducive to the effective actuation of the pressure relief mechanism 213, as well as preventing the adhesive from blocking the avoidance structure 134 which forms the avoidance chamber 134a, thus improving the safety of the battery 10.

Figure 30:
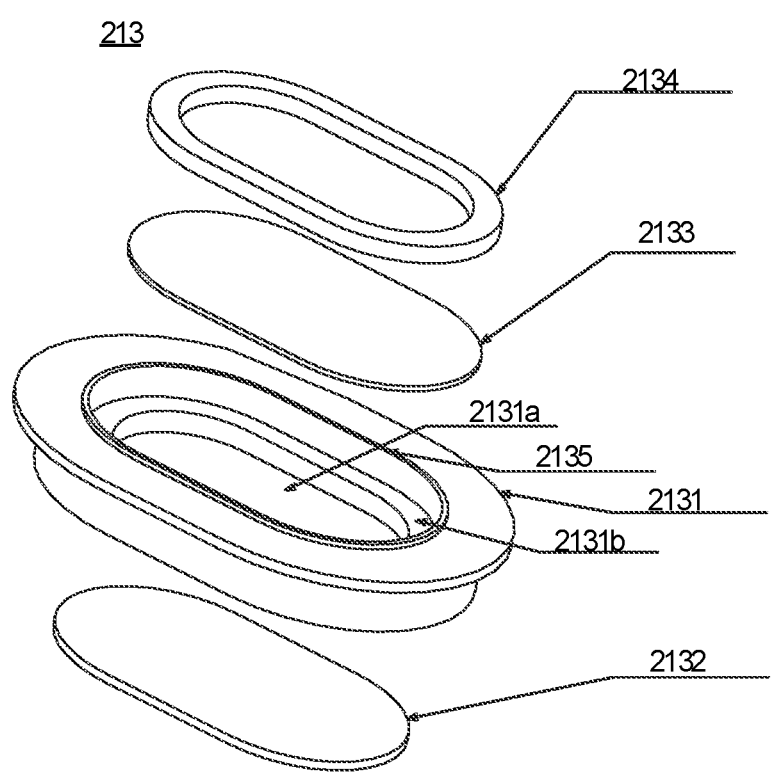
FIGS. 30 to 33 are exploded views of some embodiments of a pressure relief mechanism of the present application.
Figure 31:
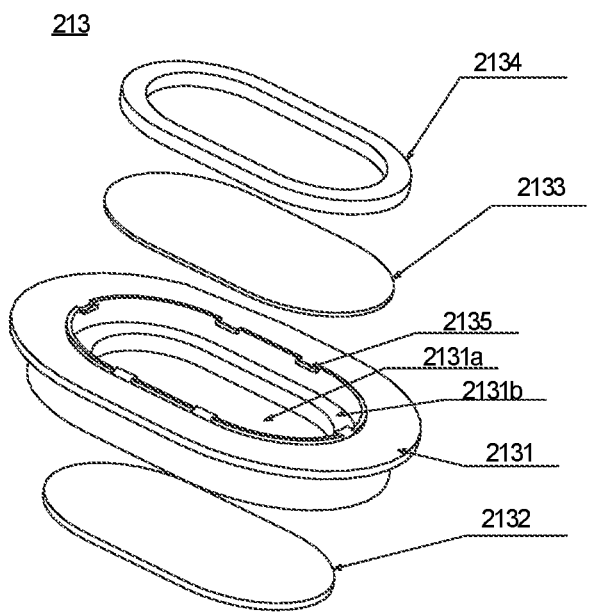

The pressure relief mechanism 213 mentioned above can take a variety of forms. For example, in some embodiments, as shown in FIGS. 30 and 31, the pressure relief mechanism 213 arranged on the battery cell 20 in the embodiments of the present application can include: a connection unit 2131, a pressure relief sheet 2132, a first protective sheet 2133, a compression ring 2134 and a pressing structure 2135. Specifically, the connection unit 2131 includes an aperture 2131a and a first boss 2131b, wherein the first boss 2131b is connected to an inner wall of the aperture 2131a and extends toward the axis of the aperture 2131a; the pressure relief sheet 2132 is arranged on one side of the first boss 2131b, the first protective sheet 2133 is arranged on the other side of the first boss 2131b that is away from the pressure relief sheet 2132, the pressure relief sheet 2132 is configured, when an internal pressure or temperature of the battery cell 20 reaches a threshold, to be actuated to release the internal pressure, and the first protective sheet 2133 is configured to protect the pressure relief sheet 2132; for the side of the first boss 2131b that is provided with the first protective sheet 2133, the side of the first protective sheet 2133 that is away from the first boss 2131b is provided with the compression ring 2134 to press the first protective sheet 2133; and the pressing structure 2135 is connected to the connection unit 2131 and can be pressed toward the axial direction of the aperture 2131a to press the compression ring 2134. FIG. 30 is a schematic diagram of the pressing structure before being pressed, and FIG. 31 is a schematic diagram of the pressing structure after being pressed.

Figure 32:
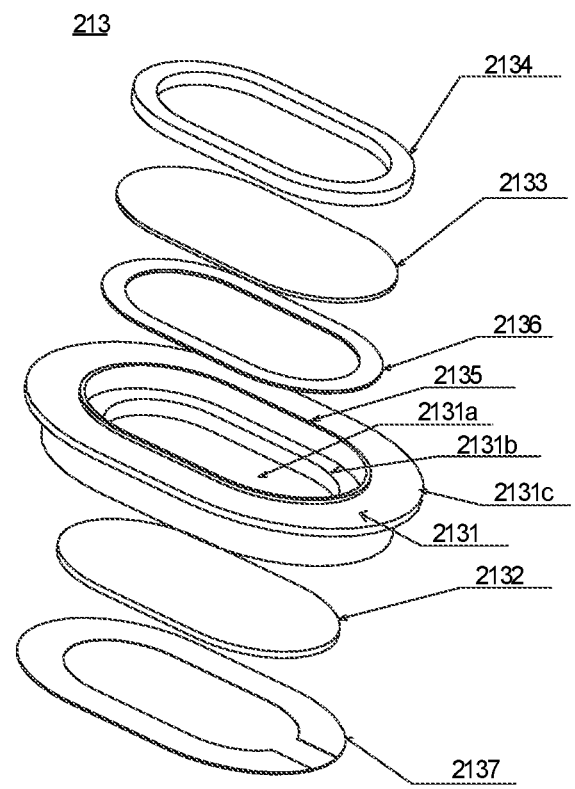
Figure 33:
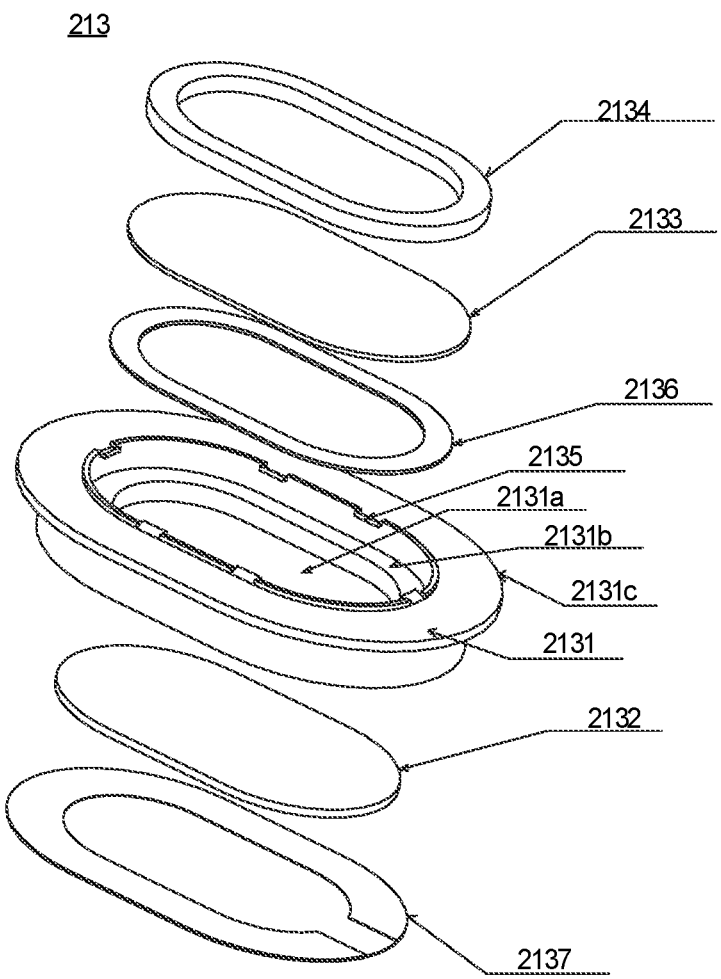

In addition, considering that when the pressure relief mechanism 213 is installed on the battery cell 20, a boss can be arranged on the outside of the pressure relief mechanism 213 for ease of fixation. Specifically, as shown in FIG. 32 (the pressing structure 2135 in FIG. 32 is the one before being pressed) and FIG. 33 (the pressing structure 2135 in FIG. 33 is the one after being pressed), the connection unit 2131 can further include a second boss 2131c, the second boss 2131c is connected to an outer wall of the connection unit 2131 and extends toward the axis of the aperture 2131a, and the second boss 2131c is used for installing the pressure relief mechanism 213 to the battery cell 20.

Considering that when the pressure relief mechanism 213 is installed, the first protective sheet 2133 is closer to the interior of the battery cell 20 than the pressure relief sheet 2132, so as shown in FIGS. 30 to 33, the second boss 2131c can be arranged to the end of the connection unit 2131 close to the pressing structure 2135. Thus, when the pressure relief mechanism 213 is installed on a wall of the battery cell 20, the surface of the pressure relief mechanism 213 close to the interior of the battery cell 20 can be kept substantially flush with an inner surface of the wall, so the installation of components such as the electrode assembly 22 and a backing plate 24 inside the battery cell 20 is not affected and the internal space is saved.

In addition, in order to increase the sealing of the first protective sheet 2133, a gasket can be arranged between the first protective sheet 2133 and the first boss 2131b. Specifically, as shown in FIGS. 32 and 33, the pressure relief mechanism 213 can further include: a ring gasket 2136 arranged between the first protective sheet 2133 and the first boss 2131b to thus increase the sealing of the first protective sheet 2133.

Considering that when the pressure relief mechanism 213 is installed to the battery cell 20, the pressure relief sheet 2132 is away from the interior of the battery cell 20 than the first protective sheet 2133, or the pressure relief sheet 2132 is located outside the battery cell 20. In order to protect the pressure relief sheet 2132 from being affected by other components other than the battery cell 20, as shown in FIG. 32 to FIG. 33, the pressure relief mechanism 213 can further include: a second protective sheet 2137 configured to protect the pressure relief sheet 2132, the second protective sheet 2137 being installed to the connection unit 2131 and being located on the side of the pressure relief sheet 2132 that is away from the first boss 2131b and covering the pressure relief sheet 2132.

Figure 34:
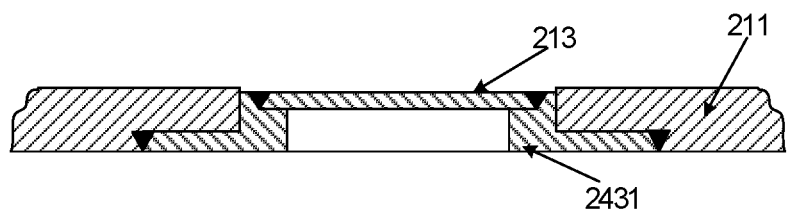
FIGS. 34 and 35 are partial schematic diagrams of some embodiments of a housing of a battery cell provided with a pressure relief mechanism according to an embodiment of the present application.
Figure 35:

In order to facilitate the assembly of the pressure relief mechanism 213 to the wall, in some embodiments, the battery cell 20 can further include a connecting mechanism 2431, as shown in FIG. 34. FIG. 34 shows a partial schematic diagram of one wall of the housing 211, the wall can be a bottom wall or a side wall of the housing 211, that is, the housing 211 in FIG. 34 refers to a part of the bottom wall of the housing 211. Also, as shown in FIGS. 34 and 35, the upper part corresponds to the interior of the housing 211, while the lower part corresponds to the exterior of the housing 211, that is, the upper surface of the wall of the housing 211 in the figures represents the inner surface of the housing 211 or the inner surface of the wall and is the surface facing the interior of the housing 211, and the lower surface of the wall of the housing 211 in the figures represents the outer surface of the housing 211 or the outer surface of the wall and is the surface facing the exterior of the housing 211. The wall of the housing 211 is provided with a through hole (not shown in the figures), the connecting mechanism 2431 is located in the through hole and is annular, the connecting mechanism 2431 is configured to connect the pressure relief mechanism 213 and the wall, the pressure relief mechanism 213 is located on the side of the connecting mechanism 2431 that is close to the interior of the housing 211, and the pressure relief mechanism 213 is configured to be actuated to release the internal pressure when the internal pressure or temperature of the battery cell 20 reaches a threshold.

It should be understood that the connecting mechanism 2431 and the pressure relief mechanism 213 in the embodiments of the present application can be two separate components or can be of an integral structure. Specifically, as shown in FIG. 34, the connecting mechanism 2431 and the pressure relief mechanism 213 can be two components, the pressure relief mechanism 213 can be a sheet-like pressure relief sheet, and the pressure relief mechanism 213 can be fixed to the side of the connecting mechanism 2431 close to the interior of the housing 211. For example, the pressure relief mechanism 213 and the connecting mechanism 2431 can be fixed by welding and so on, for example, the pressure relief mechanism 213 can be fixed to one side of the connecting mechanism 2431 by means of laser welding. On the contrary, as shown in FIG. 35, the connecting mechanism 2431 can also be integrated with the pressure relief mechanism 213, that is, the connecting mechanism 2431 and the pressure relief mechanism 213 are a one-piece component. For example, the connecting mechanism 2431 and the pressure relief mechanism 213 can be machined as a whole by stamping, but the embodiments of the present application are not limited thereto.

In the case where the pressure relief mechanism 213 is integrated with the connecting mechanism 2431 as shown in FIG. 35, the side surface of the connecting mechanism 2431 close to the interior of the housing 211 and the side surface of the pressure relief mechanism 213 close to the interior of the housing 211 is the same surface, and thus the two are flush with each other. While for the pressure relief mechanism 213 and the connecting mechanism 2431 as shown in FIG. 34, in order to enable the side surface of the connecting mechanism 2431 close to the interior of the housing 211 to be substantially flush with the side surface of the pressure relief mechanism 213 close to the interior of the housing 211, it can be achieved by providing a recess on the connecting mechanism 2431.

Figure 36:
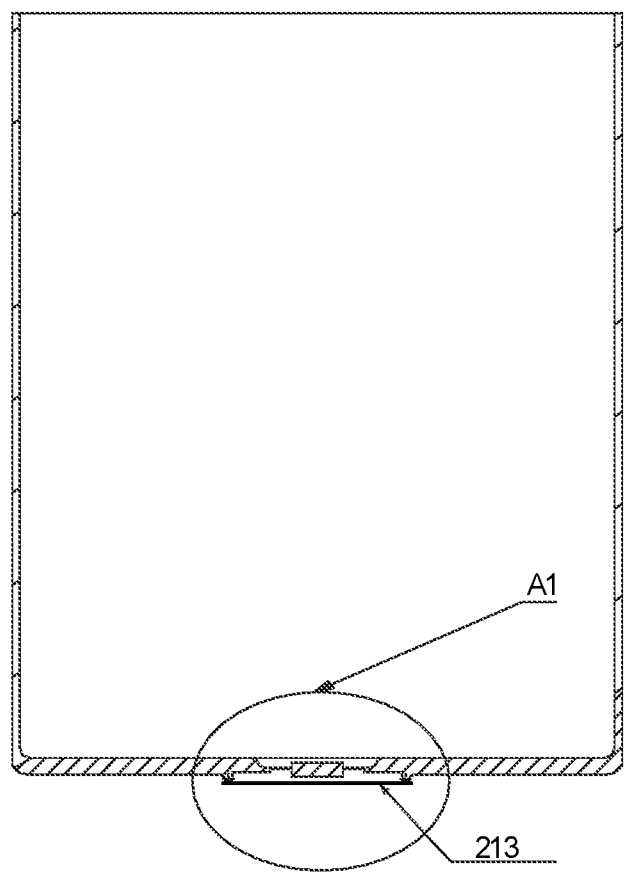
FIG. 36 is a cross-sectional view of some embodiments of a housing of a battery cell of the present application.
Figure 37:
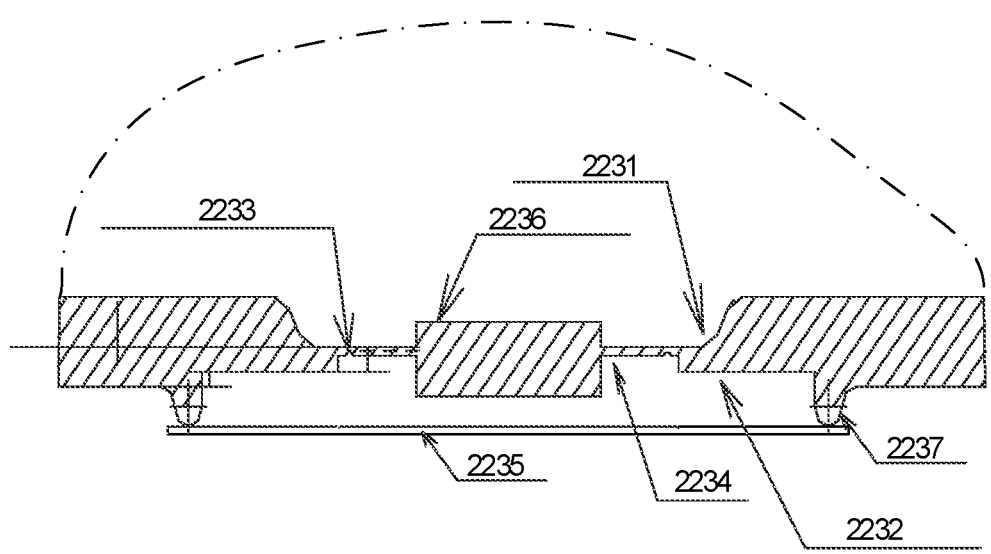
FIG. 37 is an enlarged view of a region A1 in FIG. 36.

However, regardless of either case in FIGS. 34 and 35, the connecting mechanism 2431 and the pressure relief mechanism 213 are generally in the shape of a recess, the bottom wall of the recess is opposite the opening of the recess, the side wall of the recess is adjacent to the opening of the recess, the pressure relief mechanism 213 is the bottom wall of the recess, and the connecting mechanism 2431 is the side wall of the recess. Thus, when the internal pressure or temperature of the battery cell 20 reaches a threshold, the pressure relief mechanism 213 has enough space to fracture and open, that is, the pressure relief mechanism 213 can be opened to the part of the recess, which can release the pressure inside the battery cell 20. In some embodiments, the pressure relief mechanism 213 can also be integrated with the housing 211. In such embodiments, the pressure relief mechanism 213 is constructed as a pressure relief region. FIG. 36 shows a cross-sectional view of the housing 211 in the embodiments of the present application. For example, the surface shown in the cross-sectional view can be a face passing through the pressure relief region and being parallel to a side wall with a small area of the housing 211. FIG. 37 is an enlarged view of a section A1 in FIG. 36, which section A1 includes the pressure relief region, wherein the upper part in FIG. 37 corresponds to the interior of the housing 211, and the lower part in FIG. 36 corresponds to the exterior of the housing 211. Specifically, as shown in FIG. 37, the pressure relief region in the embodiments of the present application can include a first recess 2231 provided in the inner surface of the housing 211 of the battery cell 20 and a second recess 2232 provided in the outer surface of the housing 211 of the battery cell 20, the first recess 2231 and the second recess 2232 being arranged opposite each other, wherein a bottom wall of the first recess 2231 and/or a bottom wall of the second recess 2232 are provided with a third recess 2233, and the pressure relief region is configured to be fractured at the third recess 2233 when the internal pressure of the battery cell 20 reaches a threshold to release the internal pressure.

In this way, when thermal runaway occurs within the battery cell 20, the battery cell 20 can be fractured at the relatively weak third recess 2233 to release the internal pressure. Also, as compared to the method in which the battery cell 20 is additionally installed with a pressure relief mechanism 213, the pressure relief region in the embodiments of the present application has a simpler machining process. For example, a first recess 2231, a second recess 2232 and a third recess 2233 may be provided through stamping, wherein the first recess 2231 is provided opposite the second recess 2232, and specifically, through opposite stamping to simultaneously machine two recesses, such that the machining process is convenient and efficient. Moreover, the dimension, the shape, etc. of the three recesses are flexibly set and can be adjusted according to the practical applications. Moreover, the housing 211 is usually made of metallic aluminum, so the pressure relief region is also made of aluminum, and compared with the additionally provided pressure relief mechanism 213 made of other materials, the pressure relief region in the embodiments of the present application is easier to be machined, and is also easy to be opened in time when thermal runaway occurs inside the battery cell 20, so that the venting is smoother and the venting rate is high.

In addition, considering that electrode terminals 214 are usually provided on the cover plate 212 of the battery cell 20, if the pressure relief region is also provided on the cover plate 212, the pressure relief region is fractured when thermal runaway occurs inside the battery cell 20, and a liquid or solid combustible material, which may also contain a conductive material, will be sprayed out while the internal gas pressure of the battery cell 20 is released, which may cause a short circuit between the electrode terminals 214. Moreover, considering that the electrode terminals 214 are generally directed upward, that is, toward a passenger, when the battery is installed in a vehicle, if the pressure relief region is installed on the same side of the electrode terminals 214, gas flow and other materials released after the pressure relief region is fractured will be discharged upward, which may cause burn or scald to the passenger, increasing the risk of the passenger. Therefore, the pressure relief region in the embodiments of the present application can be flexibly selected to be arranged on the bottom wall or the side wall of the housing 211 of the battery cell 20, which will not be limited by the processing method.

In the embodiments of the present application, the third recess 2233 can be provided on the bottom wall of the first recess 2231 and/or the bottom wall of the second recess 2232. However, considering that the first recess 2231 is provided on the inner surface of the housing 211 of the battery cell 20, if the third recess 2233 is provided on the bottom wall of the first recess 2231, due to the existence of the electrolytic solution in the housing 211, the electrolytic solution will accumulate in the third recess 2233 and corrode part of the third recess 2233, which may cause a premature fracture of the pressure relief region at the third recess 2233, so the third recess 2233 is usually provided on the bottom wall of the second recess 2232 on the outer surface, thereby avoiding corrosion of the electrolytic solution. The third recess 2233 being provided on the bottom wall of the second recess 2232 is taken as an example for description below.

It should be understood that the positions of the first recess 2231 and the second recess 2232 in the embodiments of the present application are arranged opposite each other, that is to say, relative to the inner surface where the first recess 2231 of the battery cell 20 is located, the projection of the second recess 2232 on the inner surface is at least partially overlapped with the first recess 2231. For example, the first recess 2231 being arranged opposite the second recess 2232 is taken as an example for description below, that is to say, the axis perpendicular to the bottom wall of the first recess 2231 is the same as the axis perpendicular to the bottom wall of the second recess 2232.

The shape of the bottom wall of each of the first recess 2231 and the second recess 2232, which are included in the pressure relief region in the embodiments of the present application, can be arranged according to the practical applications. Also, the shape of the bottom wall of the first recess 2231 can be the same as or different from the shape of the bottom wall of the second recess 2232. For ease of description, the shape of the bottom wall of the first recess 2231 being the same as the shape of the bottom wall of the second recess 2232 is taken as an example for description below. The shape of the bottom wall of the first recess 2231 and the shape of the bottom wall of the second recess 2232 can be rectangular, circular, elliptic or annular, which will be described in detail in combination with two embodiments below.

Optionally, as a first embodiment, as shown in FIGS. 36 and 37, the shape of the bottom wall of the first recess 2231 and the shape of the bottom wall of the second recess 2232 can be annular, for example, it may be a square ring, a circular ring, or a ring in other shapes. For example, a racetrack-shaped ring is taken as an example, wherein the racetrack is elliptic with two ends in an arc shape and the middle being linear, but the embodiments of the present application are not limited thereto.

As shown in FIG. 37, for ease of machining, providing the third recess 2233 on the bottom wall of the second recess 2232 may include: providing a fourth recess 2234 on the bottom wall of the second recess 2232, and providing the third recess 2233 on the bottom wall of the fourth recess 2234. Considering that the shape of the bottom wall of the second recess 2232 is annular, the shape of the bottom wall of the fourth recess 2234 can be consistent with the shape of the bottom wall of the second recess 2232 and is also set to be annular, but the embodiments of the present application are not limited thereto.

As shown in FIG. 37, the sectional shape of each of the first recess 2231, the second recess 2232, the third recess 2233 and the fourth recess 2234 in FIG. 37 in the embodiments of the present application can be set according to the practical applications. For example, the angle formed between the bottom wall and the side wall of the recess may be a right-angled recess as shown in the second recess 2232 and the fourth recess 2234 in FIG. 37, or an angled recess as shown in the first recess 2231 and the third recess 2233 in FIG. 37, and the embodiments of the present application are not limited thereto.

Since the first recess 2231 and the second recess 2232 are ring recesses, there will be a protruding structure in its central region. Here, a protruding structure 2236 close to the interior of the housing 211 is taken as an example for illustration. The protruding structure 2236 is the middle region of the annular first recess 2231, and the surface of the protruding structure 2236 close to the housing 211 may not be raised relative to the inner surface of the housing 211 excluding the pressure relief region. For example, the surface of the protruding structure 2236 close to the housing 211 can be substantially flush with the inner surface of the housing 211 excluding the pressure relief region. Alternatively, as shown in FIG. 37, the surface of the protruding structure 2236 close to the housing 211 may also be recessed relative to the inner surface of the housing 211 excluding the pressure relief region, and the embodiments of the present application are not limited thereto.

Moreover, the periphery of the first recess 2231 is also not raised relative to the inner surface of the housing 211, so the inner surface of the housing 211 is not provided with a protruding portion, and when the components such as the electrode assembly 22 in the housing 211 are installed, it will not be affected, and no additional design is needed to avoid the protruding portion, thereby saving the internal space.

As shown in FIG. 37, for the exterior of the housing 211, a projection 2237 can also be provided on the outer surface of the housing 211 around the second recess 2232, and the projection 2237 extends away from the interior of the housing 211 relative to the outer surface of the housing 211. Considering that if the first recess 2231 and the second recess 2232 are machined through stamping, there is usually a projection 2237 at the edge of the recess, and if the projection 2237 is provided inside, it will affect the installation of the electrode assembly 22 inside, and therefore, the projection 2237 can be arranged on the outer surface of the housing 211.

When the battery cell 20 is assembled into the battery 10, it is necessary to arrange a component below the battery cell 20, for example, a cooling plate may be provided to cool the battery cell 20, or a bottom protective plate may also be provided, and the embodiments of the present application are not limited thereto. Due to the existence of the projection 2237, for the component below the battery cell 20, the battery cell 20 can be assembled by providing a recessed avoidance region on the surface. For example, if the cooling plate is provided below the battery cell 20, the region of the cooling plate corresponding to the pressure relief region can be provided with a recess or a through hole, so that the projection 2237 which protrudes from the pressure relief region can be accommodated in the recess or the through hole, thereby saving space.

In addition, due to the existence of the projection 2237, a gap is formed between the surface of the pressure relief region away from the interior of the housing 211 and the surface of the component (such as the thermal management component or the bottom protective plate) located below the pressure relief region, and the pressure relief region can have a certain opening space when venting to ensure that the third recess 2233 in the pressure relief region can be fractured and opened so as to release the internal pressure.

As shown in FIG. 37, in order to protect the side of the pressure relief region away from the housing 211 from being affected by other components other than the battery cell 20, the pressure relief region may further include: a protective sheet 2235, which is configured to protect the pressure relief region, is arranged on the outer surface of the housing 211 of the battery cell 20 and covers the second recess 2232.

Figure 38:
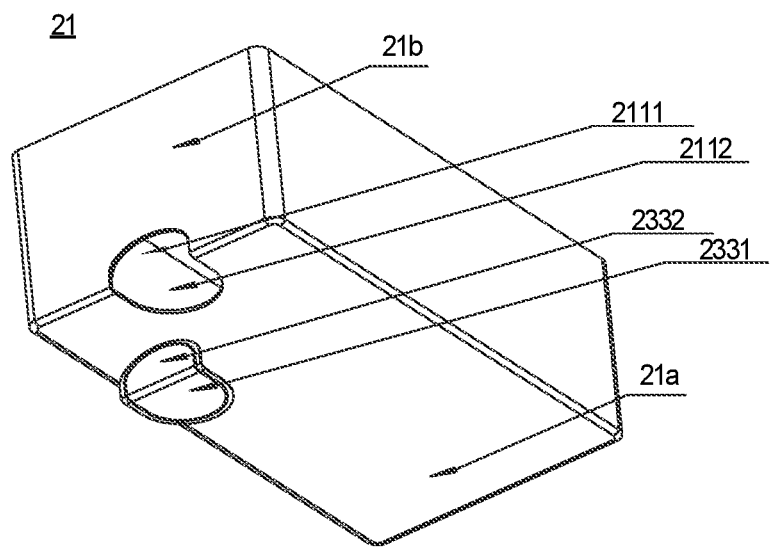
FIG. 38 is an exploded view of some embodiments of a battery cell of the present application.

As mentioned above, the pressure relief mechanism 213 can be arranged at a corner portion of the housing 211 of the battery cell 20. For example, in some embodiments, as previously mentioned, as shown in FIG. 38, the battery cell 20 in the embodiments of the present application includes at least two walls, for any two adjacent walls, for ease of description, which will be referred to as the first wall 21a and the second wall 21b below, that is, the at least two walls provided by the battery cell 20 include the first wall 21a and the second wall 21b, and the first wall 21a intersects the second wall 21b. In this situation, the pressure relief mechanism 213 includes a first portion 2331 and a second portion 2332 connected to each other, wherein the first portion 2331 is provided on the first wall 21a, and the second portion 2332 is provided on the second wall 21b, that is to say, the pressure relief mechanism 213 can be bent to form two portions, i.e. the first portion 2331 and the second portion 2332 so as to be respectively arranged on the first wall 21a and the second wall 21b. The pressure relief mechanism 213 is arranged on two walls, respectively, and for the two portions of the pressure relief mechanism 213, the first portion 2331 and/or the second portion 2332 are/is configured such that same can be damaged when the internal pressure or temperature of the battery cell 20 reaches a threshold to release the internal pressure.

Therefore, with the battery cell 20 in the embodiments of the present application, the pressure relief mechanism 213 is provided at an intersection position of any two adjacent walls, that is, the pressure relief mechanism 213 is located at the intersection of the two walls of the housing 211 of the battery cell 20, and compared with the pressure relief mechanism being provided only on one wall, the total area of the pressure relief mechanism 213 can be increased; and in the event of short circuit or overcharge, the internal temperature and gas pressure of the battery cell 20 rise sharply, the pressure relief mechanism 213 of the battery cell 20 can be fractured and opened in time from the two corresponding portions of the two walls to release the temperature and the pressure outward to prevent the battery from exploding and catching fire. In addition, since the pressure relief mechanism 213 is provided at the intersection position of the two walls, it is less affected by the assemblies inside the battery cell 20. For example, it is less affected by the drop impact of the electrode assembly 22, which can prevent the pressure relief mechanism 213 from being fractured and opened in advance. Moreover, the wall of the battery cell 20 has little deformation at the intersection position of the two walls, which can also ensure that the pressure relief mechanism 213 is not affected by creep deformation, thus improving the overall performance of the battery.

It should be understood that, the pressure relief mechanism 213 may be provided on the first wall 21a and the second wall 21b in the embodiments of the present application in a variety of ways, and that the first portion 2331 and the second portion 2332 of the pressure relief mechanism 213 may also be processed in the same or different ways. However, for ease of machining, the first portion 2331 and the second portion 2332 of the pressure relief mechanism 213 are generally machined in the same way, and the embodiments of the present application are also illustrated by taking the first portion 2331 and the second portion 2332 of the pressure relief mechanism 213 being generally machined in the same way as an example, but the embodiments of the present application are not limited thereto.

For example, providing the pressure relief mechanism 213 on the first wall 21a and the second wall 21b may include that: the pressure relief mechanism 213, the first wall 21a and the second wall 21b can be integrally formed, i.e. directly thinning the corresponding regions of the first wall 21a and the second wall 21b to form the pressure relief mechanism 213. However, considering that if the first wall 21a and the second wall 21b are the bottom wall and the side wall of the housing 211, since the housing 211 is of a hollow structure, local thinning of the bottom wall and the side wall is difficult to achieve. Therefore, providing the pressure relief mechanism 213 on the first wall 21a and the second wall 21b may further include: providing an opening on the first wall 21a and the second wall 21b respectively so as to enable the pressure relief mechanism 213 to cover the opening region.

Specifically, as shown in FIG. 38, the first wall 21a is provided with a first opening 2111 in the region where the first portion 2331 is located, the first portion 2331 covering the first opening 2111. Similarly, the second wall 21b is provided with a second opening 2112 at the region where the second portion 2332 is located, the second portion 2332 covering the second opening 2112. That is to say, the pressure relief mechanism 213 is not integrated with the housing 211 of the battery cell 200. In this way, the pressure relief mechanism 213 can be arranged separately from the battery cell 20. For example, the material of the pressure relief mechanism 213 can be different from the material of the battery cell 20, and the thickness can also be set differently, so that the pressure relief mechanism 213 can be arranged flexibly according to practical requirements.

Considering that the first portion 2331 and the second portion 2332 of the pressure relief mechanism 213 are connected, for ease of machining, the first opening 2111 can also be connected to the second opening 2112. That is, the first opening 2111 on the first wall 21a and the second opening 2112 on the second wall 21b are actually in communication with each other. In this way, only one aperture needs to be processed at the intersection position of two adjacent walls of the battery cell 20, which is convenient for processing.

In addition, the first portion 2331 and the second portion 2332 of the pressure relief mechanism 213 in the embodiments of the present application can also be connected. For the pressure relief mechanism 213 before installation, it can be of a sheet-like structure; and when the pressure relief mechanism 213 is installed, installing same on the bottom wall and the side wall of the housing 211 is taken as an example, the bottom surface can be welded first, that is, the first portion 2331 of the pressure relief mechanism 213 is welded on the bottom wall, then the pressure relief mechanism 213 is bent to form the second portion 2332, and the second portion 2332 is welded on the side wall, so that the processing is more convenient and fast.

Figure 39:
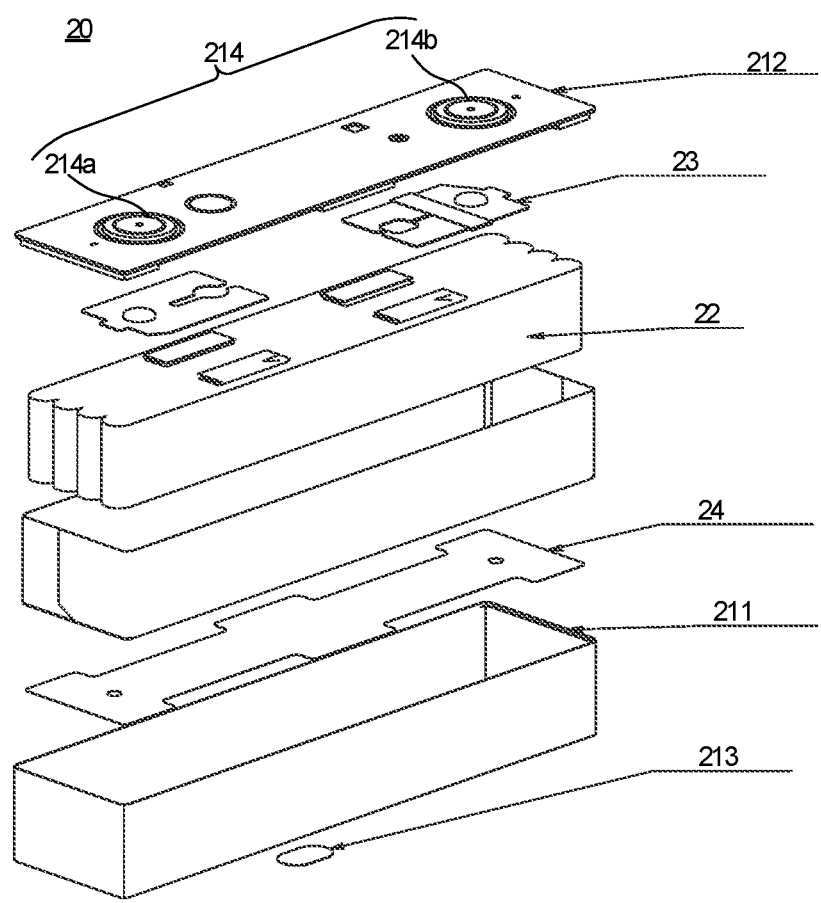
FIG. 39 is an exploded view of some embodiments of a battery cell with a pressure relief mechanism of the present application.

In some embodiments, as shown in FIG. 39, the battery cell 20 may further include a backing plate 24, which backing plate 24 is located between the electrode assembly 22 and the bottom wall of the housing 211, can support the electrode assembly 22, and can also effectively prevent the electrode assembly 22 from interfering with rounded corners around the bottom wall of housing 211. The shape of the backing plate 24 in the embodiments of the present application can be arranged according to the practical applications. For example, as shown in FIG. 39, the backing plate 24 may be configured to have a rectangular shape consistent with the shape of the bottom wall of housing 211, or may be configured to have another shape. In addition, the backing plate 24 can be provided with one or more through holes. For example, a plurality of uniformly or symmetrically arranged through holes can be arranged so that the space of the upper and lower surfaces of the backing plate 24 can be communicated, and the gas, which is generated within the electrolytic solution and the electrode assembly 22, and the electrolytic solution can be free to pass through the backing plate 24 for fluid and gas conductance.

Figure 40:
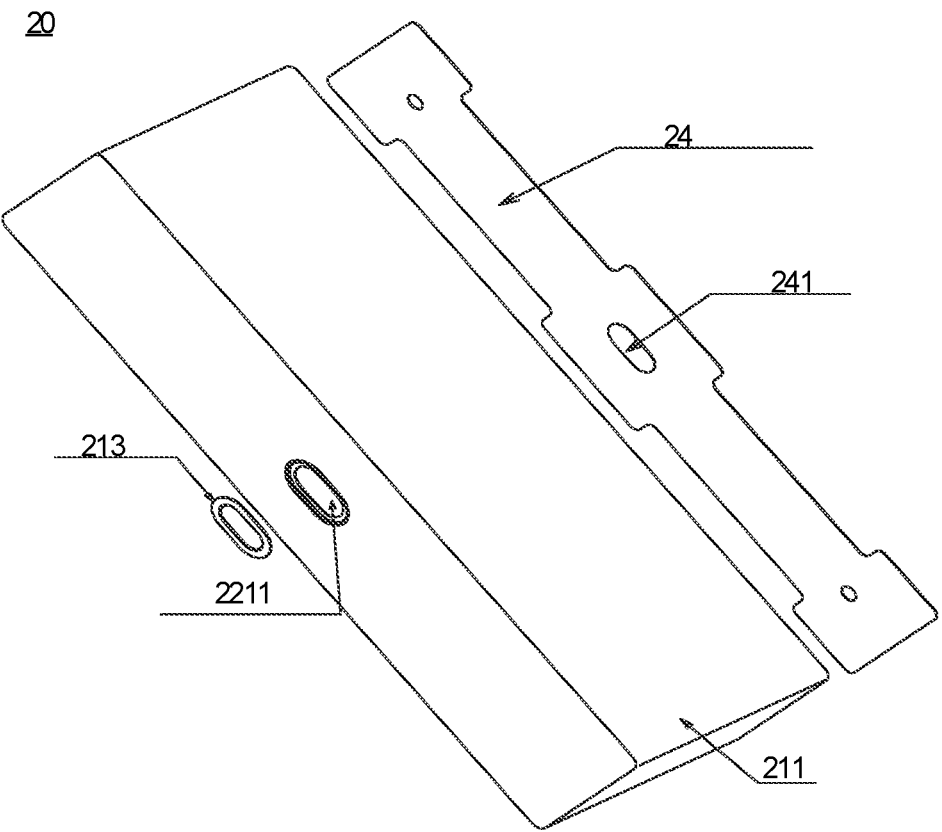
FIG. 40 is an exploded view of some embodiments of a battery cell with a pressure relief mechanism and a backing plate of the present application.

The thickness of the backing plate 24 is generally set to be 0.3 to 5 mm, and the backing plate is preferably an insulating component but can also be not insulating. For example, the backing plate 24 can be made of PP, PE, PET, PPS, Teflon, stainless steel, aluminum and other materials which are resistant to the electrolytic solution and also insulating, wherein PP, PE, PET, PPS and other plastic materials can be selected as fireproof materials, and the surface of aluminum or stainless steel and other metal materials can be anodized and insulated. The backing plate 24 can be configured to support the electrode assembly 22 and is located inside the first wall of the housing 211; and the backing plate 24 has a projection 241, as shown in FIG. 40, and the projection 241 extends toward the pressure relief mechanism 213 and is accommodated within the opening 2211. By providing the projection 241, the projection 241 extends toward the pressure relief mechanism 213, that is, the depression can be filled with the projection, so as to reduce the accumulation of the electrolytic solution in this part, alleviate the impact and corrosion of the electrolytic solution on the pressure relief mechanism 213, and avoid the premature fracture of the pressure relief mechanism 213.

The battery in the embodiments of the present application is described above with reference to FIGS. 1 to 40. The method and apparatus for preparing a battery in the embodiments of the present application are described below with reference to FIGS. 41 and 42.

Figure 41:
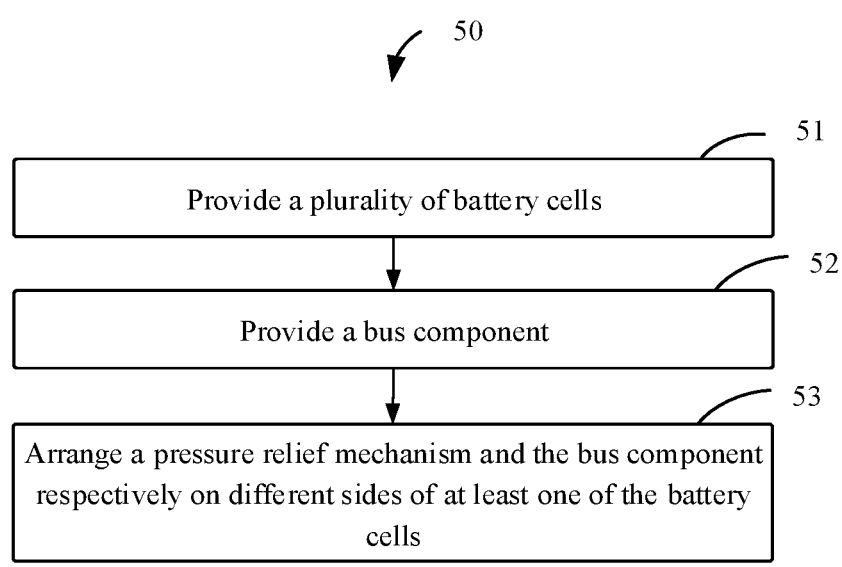
FIG. 41 shows a schematic flow chart of some embodiments of a method for preparing a battery of the present application.

Specifically, FIG. 41 shows a schematic flow chart of a method 50 for preparing a battery in the embodiments of the present application. As shown in FIG. 41, the method 50 includes: step 51: providing a plurality of battery cells, at least one of the plurality of battery cells including a pressure relief mechanism, and the pressure relief mechanism being used, when an internal pressure or a temperature of the at least one battery cell reaches a threshold, to be actuated to relieve the internal pressure; step 52: providing a bus component configured to electrically connect the plurality of battery cells; and step 53: arranging the pressure relief mechanism and the bus component respectively on different sides of the at least one battery cell, so that the emissions from the at least one battery cell are discharged in a direction away from the bus component when the pressure relief mechanism is actuated.

In some embodiments, the method further includes providing a thermal management component, which is configured to accommodate a fluid to adjust the temperatures of the plurality of battery cells, and the thermal management component being configured, when the pressure relief mechanism is actuated, to be damaged so that the emissions from the battery cells pass through the thermal management component.

In some embodiments, the method further includes: attaching the thermal management component to a first wall of at least two walls of the battery cell and providing the pressure relief mechanism on the first wall; and attaching a support component to a second wall, for supporting the battery cell.

In some embodiments, the method further includes: providing an attachment component adapted to be attached to the battery cell by means of an adhesive; and providing an isolation component, which is constructed to prevent the adhesive from being applied between the attachment component and the pressure relief mechanism.

Figure 42:
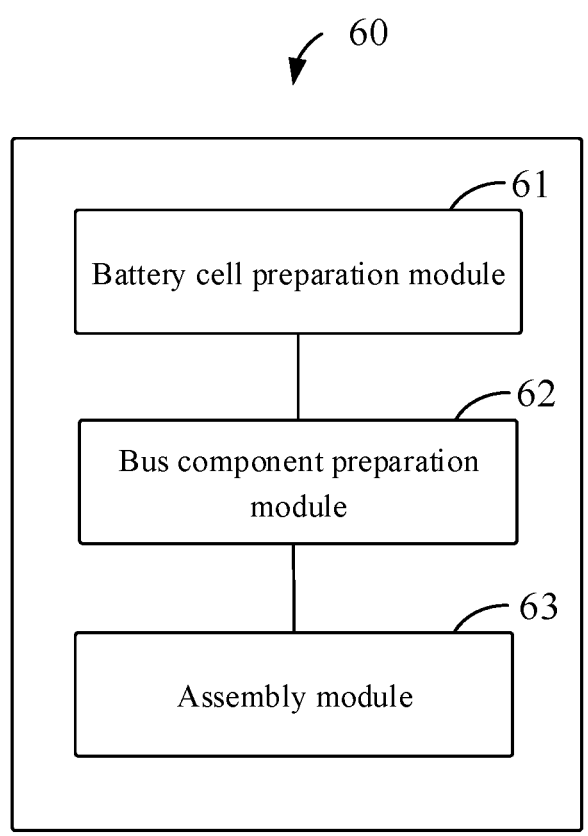
FIG. 42 shows a schematic structural diagram of some embodiments of a device for preparing a battery of the present application.

FIG. 42 shows a schematic block diagram of an apparatus 60 for preparing a battery in the embodiments of the present application. As shown in FIG. 42, the apparatus 60 in the embodiments of the present application includes: a battery cell preparation module 61 configured to prepare a plurality of battery cells, at least one of the plurality of battery cells including: a pressure relief mechanism, which is used, when an internal pressure or a temperature of the at least one battery cell reaches a threshold, to be actuated to release the internal pressure; a bus component preparation module 62 configured to prepare a bus component, the bus component being configured to electrically connect the plurality of battery cells; and an assembly module 63 configured to respectively arrange the pressure relief mechanism and the bus component on different sides of the at least one battery cell, so that the emissions from the at least one battery cell are discharged in a direction away from the bus component when the pressure relief mechanism is actuated.

It should be finally noted that, the above embodiments are merely used for illustrating, rather than limiting, the technical solutions of the present application. Although the present application has been described in detail with reference to the foregoing embodiments, it should be understood by those of ordinary skill in the art that, it may still modify the technical solutions recorded in the above-mentioned embodiments, or equivalently replace some of the technical features thereof, but such modifications or replacements do not make the essence of the corresponding technical solutions depart from the spirit and scope of the technical solutions of the embodiments of the present application.

What is claimed is:

1. A battery, comprising:
   a plurality of battery cells, at least one battery cell of the plurality of battery cells comprising:
   a pressure relief mechanism; and
   a bus component configured to electrically connect the plurality of battery cells, wherein the pressure relief mechanism and the bus component are respectively arranged on different sides of the at least one battery cell, such that emissions from the at least one battery cell are discharged in a direction away from the bus component when the pressure relief mechanism is actuated;
   wherein the battery further comprises a thermal management component, the thermal management component is configured to accommodate a liquid to adjust temperatures of the plurality of battery cells, and the thermal management component is configured to be damaged when the pressure relief mechanism is actuated, such that the emissions from the at least one battery cell passes through the thermal management component and the liquid flows out;
wherein the thermal management component comprises:
a first thermally conductive plate, the first thermally conductive plate being attached to the plurality of battery cells;
a second thermally conductive plate, the second thermally conductive plate being arranged on a side of the first thermally conductive plate that is away from the plurality of battery cells; and
a flow channel, the flow channel being formed between the first thermally conductive plate and the second thermally conductive plate for allowing the liquid to flow in the flow channel.

2. The battery according to claim 1, wherein the thermal management component further comprises:
an avoidance structure, the avoidance structure being configured to provide a space for allowing the pressure relief mechanism to be actuated, and
wherein the thermal management component is attached to the plurality of battery cells to form an avoidance chamber between the avoidance structure and the pressure relief mechanism, or the avoidance structure is a through hole penetrating the thermal management component.

3. The battery according to claim 2, wherein the avoidance structure comprises a bottom avoidance wall and a side avoidance wall surrounding the avoidance chamber, and the bottom avoidance wall is configured to be damaged when the pressure relief mechanism is actuated, such that the emissions from the battery cell pass through the thermal management component, and the side avoidance wall is configured to be damaged when the pressure relief mechanism is actuated, such that the liquid flows out.

4. The battery according to claim 3, wherein the side avoidance wall forms a predetermined included angle with respect to a direction of the pressure relief mechanism toward the thermal management component, and the predetermined included angle is greater than or equal to 15° and less than or equal to 85°.

5. The battery according to claim 2, wherein the thermal management component comprises a relief mechanism configured to be actuated when the pressure relief mechanism is actuated, to allow at least the emissions from the battery cell to be discharged through the thermal management component.

6. The battery according to claim 2, further comprising:
a collection chamber, the collection chamber being configured to collect the emissions from the battery cell and the thermal management component when the pressure relief mechanism is actuated,
wherein the avoidance chamber and the collection chamber are isolated by the thermal management component, or the avoidance structure is in communication with the collection chamber.

7. The battery according to claim 6, further comprising:
a protective member, wherein the protective member is arranged on a side of the thermal management component that is away from the plurality of battery cells, and the collection chamber is arranged between the thermal management component and the protective member.

8. The battery according to claim 7, further comprising:
a sealing member arranged between the thermal management component and the protective member to seal the collection chamber.

9. The battery according to claim 1, further comprising:
a cover body;
a case shell, the case shell and the cover body jointly forming, in an enclosing manner, an electrical chamber for accommodating the plurality of battery cells.

10. The battery according to claim 9, wherein the thermal management component is a bottom portion of the case shell, and the case shell further comprises a side portion, the side portion being hermetically connected to the thermal management component; or is integrated or arranged inside the case shell.

11. The battery according to claim 1, wherein the at least one battery cell further comprises a housing having an opening and enclosed by a plurality of walls, and a cover plate for closing the opening, and
wherein the pressure relief mechanism is arranged on at least one of the plurality of walls.

12. The battery according to claim 11, wherein an outer surface of the pressure relief mechanism is flush with or recessed into an outer surface of the at least one wall.

13. The battery according to claim 11, wherein the pressure relief mechanism is arranged at a corner portion between two adjacent walls of the plurality of walls.

14. The battery according to claim 11, wherein the number of the pressure relief mechanism is multiple, the plurality of pressure relief mechanisms being arranged on one of the plurality of walls, or
the plurality of pressure relief mechanisms being arranged on at least two of the plurality of walls.

15. A device comprising a battery, the battery being configured to provide electrical energy and comprising:
a plurality of battery cells, at least one battery cell of the plurality of battery cells comprising:
a pressure relief mechanism; and
a bus component configured to electrically connect the plurality of battery cells,
wherein the pressure relief mechanism and the bus component are respectively arranged on different sides of the at least one battery cell, such that emissions from the at least one battery cell are discharged in a direction away from the bus component when the pressure relief mechanism is actuated;
wherein the battery further comprises a thermal management component, the thermal management component is configured to accommodate a liquid to adjust temperatures of the plurality of battery cells, and the thermal management component is configured to be damaged when the pressure relief mechanism is actuated, such that the emissions from the at least one battery cell passes through the thermal management component and the liquid flows out;
wherein the thermal management component comprises:
a first thermally conductive plate, the first thermally conductive plate being attached to the plurality of battery cells;
a second thermally conductive plate, the second thermally conductive plate being arranged on a side of the first thermally conductive plate that is away from the plurality of battery cells; and
a flow channel, the flow channel being formed between the first thermally conductive plate and the second thermally conductive plate for allowing the liquid to flow in the flow channel.

16. An apparatus for preparing a battery, the apparatus comprising:
a battery cell preparation module configured to prepare a plurality of battery cells, at least one battery cell of the plurality of battery cells comprising:
a pressure relief mechanism;

a bus component preparation module configured to prepare a bus component, the bus component being configured to electrically connect the plurality of battery cells; and an assembly module configured to respectively arrange the pressure relief mechanism and the bus component on different sides of the at least one battery cell, such that emissions from the at least one battery cell are discharged in a direction away from the bus component when the pressure relief mechanism is actuated;

wherein the battery further comprises a thermal management component, the thermal management component is configured to accommodate a liquid to adjust temperatures of the plurality of battery cells, and the thermal management component is configured to be damaged when the pressure relief mechanism is actuated, such that the emissions from the at least one battery cell passes through the thermal management component and the liquid flows out;

wherein the thermal management component comprises:

a first thermally conductive plate, the first thermally conductive plate being attached to the plurality of battery cells;

a second thermally conductive plate, the second thermally conductive plate being arranged on a side of the first thermally conductive plate that is away from the plurality of battery cells; and a flow channel, the flow channel being formed between the first thermally conductive plate and the second thermally conductive plate for allowing the liquid to flow in the flow channel.

17. The battery according to claim 9, wherein the cover body is adjacent to the bus component and the distance between the two is less than 2 mm.

* * * * *